(12) United States Patent
Kumatani et al.

(10) Patent No.: US 9,409,152 B2
(45) Date of Patent: Aug. 9, 2016

(54) CATALYST SUPPORT FOR PURIFICATION OF EXHAUST GAS, CATALYST FOR PURIFICATION OF EXHAUST GAS USING THE SAME, AND METHOD FOR PRODUCING THE CATALYST SUPPORT FOR PURIFICATION OF EXHAUST GAS

(71) Applicants: KABUSHIKI KAISHA TOYOTA CHUO KENKYUSHO, Nagakute-shi, Aichi (JP); TOYOTA JIDOSHA KABUSHIKI KAISHA, Toyota-shi, Aichi (JP)

(72) Inventors: Naoki Kumatani, Nagakute (JP); Akira Morikawa, Nagoya (JP); Kae Konishi, Nagoya (JP); Kimitoshi Sato, Inazawa (JP); Toshitaka Tanabe, Nagakute (JP); Akihiko Suda, Seto (JP); Masahide Miura, Toyota (JP); Isao Chinzei, Toyota (JP); Hiromasa Suzuki, Toyota (JP); Takeshi Nobukawa, Toyota (JP); Takahiro Hayashi, Susono (JP)

(73) Assignees: KABUSHIKI KAISHA TOYOTA CHUO KENKYUSHO, Nagakute-shi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 31 days.

(21) Appl. No.: 14/410,345

(22) PCT Filed: Jun. 20, 2013

(86) PCT No.: PCT/JP2013/067584
§ 371 (c)(1),
(2) Date: Dec. 22, 2014

(87) PCT Pub. No.: WO2013/191298
PCT Pub. Date: Dec. 27, 2013

(65) Prior Publication Data
US 2015/0266004 A1 Sep. 24, 2015

(30) Foreign Application Priority Data

Jun. 20, 2012 (JP) ................................. 2012-138950
Jun. 20, 2012 (JP) ................................. 2012-138958
Jun. 14, 2013 (JP) ................................. 2013-125459

(51) Int. Cl.
*B01J 23/00* (2006.01)
*B01J 23/02* (2006.01)
(Continued)

(52) U.S. Cl.
CPC ................ *B01J 23/10* (2013.01); *B01J 21/066* (2013.01); *B01J 23/44* (2013.01); *B01J 23/63* (2013.01);
(Continued)

(58) Field of Classification Search
CPC ............ B01J 23/10; B01J 23/44; B01J 23/56; B01J 23/63; B01J 23/72; B01J 23/76; B01J 23/83; B01J 37/04; B01J 37/08; B01J 37/082; B01J 37/12
USPC ......... 502/304, 327, 331, 332, 333, 339, 346, 502/349, 355, 415, 439
See application file for complete search history.

(56) References Cited

U.S. PATENT DOCUMENTS 6,335,305 B1 * 1/2002 Suzuki ................ B01D 53/945
502/325
7,547,656 B2 * 6/2009 Miura .................. B01D 53/945
502/302

(Continued)

FOREIGN PATENT DOCUMENTS

EP 1 206 965 A1 5/2002
EP 2 476 650 A1 7/2012
(Continued)

OTHER PUBLICATIONS

Jul. 8, 2015 Office Action issued in Japanese Patent Application No. 2013-125459.
(Continued)

*Primary Examiner* — Cam N. Nguyen
(74) *Attorney, Agent, or Firm* — Oliff PLC

(57) ABSTRACT

A catalyst support for purification of exhaust gas includes a porous composite metal oxide, the porous composite metal oxide containing alumina, ceria, and zirconia and having an alumina content ratio of from 5 to 80% by mass, wherein after calcination in the air at 1100° C. for 5 hours, the porous composite metal oxide satisfies a condition such that standard deviations of content ratios (as at % unit) of aluminum, cerium and zirconium elements are each 19 or less with respect to 100 minute areas (with one minute area being 300 nm in length×330 nm in width) of the porous composite metal oxide, the standard deviation being determined by energy dispersive X-ray spectroscopy using a scanning transmission electron microscope equipped with a spherical aberration corrector.

15 Claims, 4 Drawing Sheets

(51) Int. Cl.
| | |
|---|---|
| B01J 23/08 | (2006.01) |
| B01J 23/10 | (2006.01) |
| B01J 23/40 | (2006.01) |
| B01J 23/42 | (2006.01) |
| B01J 23/44 | (2006.01) |
| B01J 23/56 | (2006.01) |
| B01J 23/70 | (2006.01) |
| B01J 23/72 | (2006.01) |
| B01J 20/00 | (2006.01) |
| B01J 21/04 | (2006.01) |
| B01J 21/06 | (2006.01) |
| B01J 23/63 | (2006.01) |
| B01J 35/00 | (2006.01) |
| B01J 35/02 | (2006.01) |
| B01J 35/10 | (2006.01) |
| B01J 37/00 | (2006.01) |
| B01J 23/83 | (2006.01) |
| B01J 37/04 | (2006.01) |
| B01J 37/08 | (2006.01) |
| B01D 53/94 | (2006.01) |

(52) U.S. Cl.
CPC .............. *B01J 23/83* (2013.01); *B01J 35/002* (2013.01); *B01J 35/023* (2013.01); *B01J 35/1009* (2013.01); *B01J 35/1014* (2013.01); *B01J 35/1038* (2013.01); *B01J 35/1047* (2013.01); *B01J 35/1057* (2013.01); *B01J 35/1061* (2013.01); *B01J 35/1066* (2013.01); *B01J 35/1071* (2013.01); *B01J 35/1076* (2013.01); *B01J 37/0063* (2013.01); *B01J 37/04* (2013.01); *B01J 37/08* (2013.01); *B01D 53/945* (2013.01); *B01D 2255/1023* (2013.01); *B01D 2255/2065* (2013.01); *B01D 2255/2092* (2013.01); *B01D 2255/20715* (2013.01); *B01D 2255/20761* (2013.01); *B01D 2255/908* (2013.01); *B01D 2255/9205* (2013.01); *B01D 2255/9207* (2013.01); *Y02T 10/22* (2013.01)

(56) References Cited

U.S. PATENT DOCUMENTS

| | | | | |
|---|---|---|---|---|
| 7,604,789 B2* | 10/2009 | Takeshima | ......... | B01D 53/9445 423/263 |
| 7,713,908 B2* | 5/2010 | Yamamoto | ............. | B01J 23/002 502/104 |
| 7,998,896 B2* | 8/2011 | Kitamura | ............. | B01D 53/945 422/180 |
| 8,067,330 B2* | 11/2011 | Suzuki | ................. | B01D 53/945 502/302 |
| 8,105,561 B2* | 1/2012 | Hatanaka | ............. | B01D 53/945 422/111 |
| 8,114,354 B2* | 2/2012 | Li | ..................... | B01D 53/9454 422/177 |
| 8,202,819 B2* | 6/2012 | Kohara | .............. | B01D 53/9468 422/169 |
| 8,206,671 B2* | 6/2012 | Takeshima | ......... | B01D 53/9445 423/263 |
| 8,309,488 B2* | 11/2012 | Kitamura | ............. | B01D 53/945 502/304 |
| 8,337,791 B2* | 12/2012 | Kohara | ................ | B01D 53/945 423/213.2 |
| 8,574,524 B2* | 11/2013 | Takeshima | ......... | B01D 53/9445 423/263 |
| 8,999,252 B2* | 4/2015 | Cho | ..................... | B01D 53/945 422/180 |
| 2002/0160912 A1 | 10/2002 | Morikawa et al. | | |
| 2007/0082812 A1* | 4/2007 | Saito | ........................ | B01J 23/38 502/302 |
| 2007/0099298 A1* | 5/2007 | Suzuki | ................. | B01D 53/945 436/37 |
| 2010/0207069 A1 | 8/2010 | Fujie et al. | | |
| 2011/0047975 A1* | 3/2011 | Nakayama | ........... | B01D 53/945 60/274 |
| 2011/0274603 A1* | 11/2011 | Kohara | ................ | B01D 53/945 422/177 |
| 2012/0129690 A1* | 5/2012 | Larcher | .................... | B01J 21/12 502/304 |
| 2012/0142523 A1 | 6/2012 | Sato et al. | | |
| 2013/0336864 A1* | 12/2013 | Zheng | ..................... | B01J 23/63 423/213.5 |

FOREIGN PATENT DOCUMENTS

| | | |
|---|---|---|
| JP | 2001-170500 A | 6/2001 |
| JP | 2002-160922 A | 6/2002 |
| JP | 2006-298759 A | 11/2006 |
| JP | 2010-029844 A | 2/2010 |
| JP | 2012-187523 A | 10/2012 |
| WO | 2011/030875 A1 | 3/2011 |

OTHER PUBLICATIONS

Dec. 3, 2015 Office Action issued on the corresponding Chinese Patent Application No. 201380038899.X.

Garrido et al. "Reaction-Sintered Mullite-Zirconia Composited by Colloidal Processing of Alumina—Zircon—CeO2 Mixtures". pp. 250-257, 2004, Materials Science & Engineering.

Adamopoulos et al. "A Nanophase Oxygen Storage Material: Alumina-Coated Metal-Based Ceria". pp. 677-689, 2009, Journal of the European Ceramic Society.

Jan. 30, 2015 Office Action issued in Japanese Application No. 2012-138958.

Oct. 24, 2013 International Search Report in International Application No. PCT/JP2013/067584.

Oct. 24, 2013 Written Opinion of the International Searching Authority issued in International Application No. PCT/JP2013/067584.

Jul. 31, 2014 Written Opinion of the International Search Authority issued in International Application No. PCT/JP2013/067584.

Oct. 24, 2014 International Preliminary Report on Patentability issued in International Application No. PCT/JP2013/067584.

* cited by examiner

1 μm

1 μm

CATALYST SUPPORT FOR PURIFICATION OF EXHAUST GAS, CATALYST FOR PURIFICATION OF EXHAUST GAS USING THE SAME, AND METHOD FOR PRODUCING THE CATALYST SUPPORT FOR PURIFICATION OF EXHAUST GAS

TECHNICAL FIELD

The present invention relates to a catalyst support for purification of exhaust gas, a catalyst for purification of exhaust gas using the same, and a method for producing the catalyst support for purification of exhaust gas.

BACKGROUND ART

As a catalyst for purification of exhaust gas, there are widely known three-way catalysts in which a noble metal such as platinum, rhodium or palladium is supported on a metal oxide support made of alumina, titania, silica, zirconia, ceria or the like. Also, it is practiced that multiple species of metal oxide supports are mixed or laminated to utilize the characteristics of the respective metal oxide supports for the purpose of improving catalytic activities. For example, ceria has an oxygen storage capacity (OSC) of storing oxygen when the oxygen concentration in exhaust gas is high and of releasing oxygen when the oxygen concentration in exhaust gas is low; however, its heat resistance is comparatively low. Accordingly, it is practiced that ceria is allowed to form a solid solution or to be mixed with zirconia or alumina, whereby the heat resistance of a catalyst will be improved.

Japanese Unexamined Patent Application Publication No. 2001-170500 (PTL 1) discloses a support prepared by mixing an alumina-based mesoporous powder with a ceria-zirconia solid solution, as well as discloses a catalyst for purification of exhaust gas in which a noble metal is supported on this support. Also, Japanese Unexamined Patent Application Publication No. 2010-298444 (PTL 2) discloses a support comprising an inorganic oxide prepared by mixing boehmite or an alumina powder with a zirconia powder stabilized by Y or Ce, as well as discloses a catalyst for catalytic partial oxidation of hydrocarbons in which an active metal such as a noble metal is supported on this support. Further, Japanese Unexamined Patent Application Publication No. 2006-298759 (PTL 3) discloses a composite oxide, which contains alumina, ceria, and zirconia, prepared by mixing an alumina compound, such as aluminum nitrate or an activated alumina powder, with cerium nitrate or zirconium nitrate, as well as discloses a catalyst for purification of exhaust gas in which a noble metal is impregnated in this composite oxide. In addition, Japanese Unexamined Patent Application Publication No. 2002-160922 (PTL 4) discloses a composite oxide, which contains alumina and a ceria-zirconia solid solution, prepared by the coprecipitation method using an aluminum compound, a cerium compound, and a zirconium compound, as well as discloses a catalyst for purification of exhaust gas in which a noble metal is supported on this composite oxide.

However, the catalysts comprising the supports prepared by the powder mixing methods (PTLs 1-3) or the coprecipitation methods (PTLs 3 and 4) were not necessarily excellent in heat resistance: there were instances where their OSCs or their catalytic activities lower when exposed to high temperatures. Particularly, transition metals such as copper, which are less expensive than the above-described noble metals, are effective as catalysts for purification of exhaust gas; however, they are inferior to the noble metals in heat resistance and are prone to cause grain growth. Thus, there were instances where their catalytic activities lower when exposed to high temperatures.

CITATION LIST

Patent Literature

[PTL 1] Japanese Unexamined Patent Application Publication No. 2001-170500
[PTL 2] Japanese Unexamined Patent Application Publication No. 2010-29844
[PTL 3] Japanese Unexamined Patent Application Publication No. 2006-298759
[PTL 4] Japanese Unexamined Patent Application Publication No. 2002-160922

SUMMARY OF INVENTION

Technical Problem

The present invention has been made in view of the above-described problems of the prior art technologies. An object of the present invention is to provide a catalyst support for purification of exhaust gas capable of producing a catalyst that displays excellent oxygen storage capacity (OSC) and a catalyst that displays excellent catalytic activity (particularly, a transition metal-supported catalyst that displays high catalytic activity even at a relatively low temperature) even when exposed to high temperatures, as well as to provide a production method thereof.

Solution to Problem

The present inventors have devoted themselves to keen studies for achieving the above object. As a result, the present inventors have found that: the support employs a porous composite metal oxide containing alumina, ceria, and zirconia and having an alumina content ratio within a predetermined range, wherein after heat treatment at a high temperature (e.g., 1100° C.), alumina, ceria, and zirconia are disposed in a state where they are mutually dispersed finely and uniformly; thereby, the catalyst in which a noble metal is supported on this support displays excellent OSC even after exposure to a high temperature for a prolonged time (e.g., after a durability test at 1100° C. for 5 hours); and the catalyst in which a transition metal is supported on the support displays excellent catalytic activity, particularly high catalytic activity even at a relatively low temperature even after exposure to a high temperature for a prolonged time (e.g., after a durability test at 900° C. for 5 hours). Thus, the present inventors have come to the completion of the present invention.

Specifically, a catalyst support for purification of exhaust gas of the present invention comprises a porous composite metal oxide containing alumina, ceria, and zirconia and having an alumina content ratio of from 5 to 80% by mass, wherein after calcination in the air at 1100° C. for 5 hours, the porous composite metal oxide satisfies a condition such that standard deviations of content ratios (as at % unit) of aluminum, cerium and zirconium elements are each 19 or less (preferably, 18.5 or less) with respect to 100 minute areas (with one minute area being 300 nm in length×330 nm in width) of the porous composite metal oxide, the standard deviation being determined by energy dispersive X-ray spectroscopy using a scanning transmission electron microscope equipped with a spherical aberration corrector.

In the catalyst support for purification of exhaust gas of the present invention, the porous composite metal oxide after calcination in the air at 1100° C. for 5 hours preferably satisfies conditions such that a total pore volume of pores having pore diameters within a range of from 1 nm to 0.1 μm is 0.1 cm³/g or more, the pore diameter being determined by a nitrogen adsorption method, and that a total pore volume of pores having pore diameter within a range of from 0.1 μm to 10 μm is 0.1 cm³/g or more, the pore diameter being determined by a mercury intrusion method.

Also, in the catalyst support for purification of exhaust gas of the present invention, the porous composite metal oxide after calcination in the air at 1100° C. for 5 hours preferably satisfy a condition such that a BET specific surface area determined by a nitrogen adsorption method is 2 m²/g or more.

Further, in the catalyst support for purification of exhaust gas of the present invention, the porous composite metal oxide after calcination in the air at 1100° C. for 5 hours preferably satisfy a condition such that standard deviations of content ratios (as at % unit) of cerium and zirconium elements are each 15 or less with respect to the 100 minute areas, the standard deviation being determined by the energy dispersive X-ray spectroscopy.

A first catalyst for purification of exhaust gas of the present invention comprises the catalyst support for purification of exhaust gas of the present invention thus-mentioned and a noble metal (preferably, palladium) supported on the catalyst support, wherein the porous composite metal oxide contains from 5 to 30% by mass of alumina, from 25 to 39% by mass of ceria, and from 33 to 51% by mass of zirconia.

A second catalyst for purification of exhaust gas of the present invention comprises the catalyst support for purification of exhaust gas of the present invention and a transition metal (preferably, copper) supported on the catalyst support, wherein the porous composite metal oxide contains from 30 to 80% by mass of alumina.

A method for producing a catalyst support for purification of exhaust gas of the present invention is a production method of a catalyst support for purification of exhaust gas comprising a porous composite metal oxide containing alumina, ceria, and zirconia, the method comprising the steps of:

preparing a first raw material solution containing an aluminum ion, a cerium ion, and a zirconium ion so that an alumina content ratio of the porous composite metal oxide can be from 5 to 80% by mass;

preparing a second raw solution containing a high-molecular dispersant having a weight average molecular weight of from 3000 to 15000;

introducing independently the first raw material solution and the second raw material solution directly into a region in which a shear rate is from 1000 to 200000 sec$^{-1}$, and homogeneously mixing the raw material solutions to obtain a colloidal solution of metal compounds;

adjusting a pH of the colloidal solution to between 3 and 5;

optionally, adding an organic amine to the colloidal solution and performing gelation treatment to obtain a suspension of metal compounds; and degreasing the colloidal solution after the pH adjustment or the suspension of metal compounds and subjecting the solution or the suspension to heat treatment at 700 to 1050° C. in an oxidizing atmosphere, to obtain the porous composite metal oxide.

In the method for producing a catalyst support for purification of exhaust gas of the present invention, it is preferred that at least one of the first and second raw material solutions further contain a low-molecular dispersant having a molecular weight of from 40 to 200, and it is particularly preferred that the low-molecular dispersant be contained in the first raw material solution.

Note that it is not known exactly why the production method of the present invention makes it possible to obtain the porous composite metal oxide in which alumina, ceria, and zirconia are disposed at a high degree of mutual and fine dispersion (i.e., in a state of being mutually, finely and uniformly dispersed) even after heat treatment at a high temperature (in the air, at 1100° C., for 5 hours). However, the present inventors presume the reason to be as will be described below. Specifically, nanoparticles such as crystallites of a metal compound are prone to aggregate in an aqueous solution such as water, and generally, the aggregation is suppressed by adding a high-molecular dispersant and causing the high-molecular dispersant to adsorb onto the nanoparticles. It is presumed that the high-molecular dispersant (polyalkyleneimine, polyethylene glycol, polyacrylic acid, or the like) to be used in the present invention also suppresses the aggregation by adsorbing onto the nanoparticles. However, aggregates having large particle diameters tend to be formed only if the high-molecular dispersant is added and an ordinary stirring is performed. This is presumably due to that because the high-molecular dispersant is generally larger than the primary particles and easily forms cross-linked structures, the nanoparticles onto which the high-molecular dispersant has adsorbed aggregate along with the crosslinking reaction of the high-molecular dispersant, while the high-molecular dispersant adsorbs onto multiple crystallites of the metal compounds simultaneously.

On the other hand, in the production method of the present invention, since a predetermined shearing force is applied to the reaction field together with the addition of the high-molecular dispersant, the high-molecular dispersant adsorbs onto the nanoparticles simultaneously with the disruption of the aggregate structure of the crystallites of the metal compounds, while the pH of a colloidal solution is adjusted to a predetermined condition. Therefore, the nanoparticles are presumably present in the colloidal solution in a state of aggregates having relatively small particle diameters. In addition, the high-molecular dispersant is present stably in the colloidal solution, and thus, aggregates having large particle diameters are unlikely to be formed. Further, in the production method of the present invention, since such a colloidal solution is at a pH condition under which the dispersion state can be maintained in liquid, the nanoparticles are presumably dispersed stably in the colloidal solution in a state of aggregates having relatively small particle diameters. Additionally, in the production method of the present invention, since such a colloidal solution in which the nanoparticles are uniformly dispersed is degreased and is subjected to heat treatment under a specific temperature condition, a porous composite metal oxide in which alumina, ceria, and zirconia are disposed at a high degree of mutual and fine dispersion is presumably obtained.

Also, it is not known exactly why in the case where an organic amine is added to the above-described colloidal solution and gelation treatment is performed, a porous composite metal oxide in which alumina, ceria, and zirconia are disposed at a high degree of mutual and fine dispersion is obtained even after the heat treatment at high temperature. However, the present inventors presume the reason to be as will be described below. Specifically, when a basic solution such as ammonia water is added to the colloidal solution to adjust the pH to 7 or more, the high-molecular dispersant such as polyalkyleneimine presumably aggregates out of the colloidal particles. Then, the colloidal particles that have lost the high-molecular dispersant also aggregate, and thus the colloidal solution presumably turns to be a suspension. Particularly, it is presumed that with respect to alumina, which is considered to have lower crystallinity than a ceria/zirconia colloidal precursor, the aggregation is notable. Further, it is presumed that alumina particles aggregate in a porous composite metal oxide obtained using such a suspension. In the case where such a porous composite metal oxide is subjected to heat treatment at high temperature, it is presumed that the grain growth of alumina accelerates, while the diffusion barrier function of alumina does not sufficiently act to also cause the grain growth of ceria and zirconia and that the degree of mutual and fine dispersion among alumina, ceria, and zirconia lowers. By contrast, in the production method of the present invention, since the organic amine is added to the colloidal solution, it is presumed that even when the high-molecular dispersant, such as polyalkyleneimine, separates out of the colloidal particles, the organic amine achieves a similar role to the high-molecular dispersant and the excessive aggregation of alumina, ceria, and zirconia is suppressed. Consequently, alumina, ceria, and zirconia are presumably disposed at a high degree of mutual and fine dispersion in the obtained porous composite metal oxide. In such a porous composite metal oxide, even if subjected to heat treatment at high temperature, the grain growth of ceria/zirconia is sufficiently suppressed by virtue of the diffusion barrier function of alumina that is highly and finely dispersed, its heat resistance is high and thus, the high degree of mutual and fine dispersion among alumina, ceria, and zirconia is presumably maintained even after the heat treatment at high temperature.

Moreover, it is not known exactly why the production method of the present invention makes it possible to obtain a porous composite metal oxide having pores (mesopores) with pore diameters of from 1 nm to 0.1 μm and pores (macropores) with pore diameters of from 0.1 μm to 10 μm, in which the pores respectively have relatively large totals of pore volumes even after heat treatment at high temperature, as well as further having relatively large specific surface areas. However, the present inventors presume the reason to be as will be described below. Specifically, in the production method of the present invention, a colloidal solution in which nanoparticles are uniformly dispersed in a state of aggregates having relatively small particle diameters is degreased and subjected to heat treatment under a specific temperature condition; thereby, a porous composite metal oxide in which the nanoparticles are aggregated is presumably formed with the gaps between the nanoparticles forming the above-described mesopores. Also, it is presumed that because the high-molecular dispersant is removed when the colloidal solution is degreased, the macropores are presumably formed in the porous composite metal oxide. In addition, this porous composite metal oxide contains a predetermined amount of alumina having excellent heat resistance. Since the crystallinity of this alumina is high and the secondary aggregate structure is stable, the macropores are hardly disrupted even when subjected to the heat treatment at high temperature, while by virtue of the diffusion barrier function of alumina that is highly and finely dispersed, the grain growth of ceria and zirconia is suppressed. Therefore, relatively large total pore volume and specific surface area are presumably obtained.

Also, it is not known exactly why a noble metal-supported catalyst for purification of exhaust gas comprising as the support, such a porous composite metal oxide displays excellent OSC even after exposure to high temperature. However, the present inventors presume the reason to be as will be described below. Specifically, in the porous composite metal oxide according to the present invention, the high degree of mutual and fine dispersion among alumina, ceria, and zirconia is secured even after the heat treatment at high temperature. This implies that one species of the particles, which are disposed at a high degree of mutual and fine dispersion, functions as an effective diffusion barrier against the other species upon the heat treatment with high temperature; thus, it is presumed that the grain growths of the respective particles are effectively suppressed. For this reason, in the porous composite metal oxide of the present invention, surface areas of ceria and zirconia are presumed to be sufficiently secured even after the heat treatment at high temperature. Normally, in order for the OSC to be effectively manifested, a noble metal such as Pd or Pt is supported on a composite metal oxide having OSC, such as ceria/zirconia. Further, as there are more contact interfaces between the composite metal oxide having OSC and the noble metal, namely more OSC active sites, the OSC will be manifested more effectively. In the noble metal-supported catalyst of the present invention, the noble metal is supported on the support in which the surface areas of ceria and zirconia are sufficiently secured after the heat treatment at high temperature, as mentioned above; therefore, the contact areas of ceria and zirconia with the noble metal are sufficiently secured even when exposed to high temperature, while the noble metal is supported on the support in which the grain growths of the respective particles are effectively suppressed upon the heat treatment at high temperature. For these reasons, the grain growth of the noble metal particles themselves even when exposed to high temperature is presumably also suppressed. It is, therefore, presumed that in the noble metal-supported catalyst of the present invention, thermal degradation hardly occurs even when exposed to high temperature, a sufficient amount of OSC active sites is present, and excellent OSC is displayed. Also, in the porous composite metal oxide according to the present invention, the total pore volume (particularly, the total pore volume of macropores) after the heat treatment at high temperature is relatively large; therefore, in the above-described noble metal-supported catalyst after exposure to high temperature, the diffusibility of gas into the support is sufficiently secured, a majority of reactant gas easily reaches the active sites inside the support, and thus, excellent OSC has been presumably obtained. Further, the porous composite metal oxide according to the present invention has a relatively large specific surface after the heat treatment at high temperature, which also is presumably a factor of the noble metal-supported catalyst after exposure to high temperature displaying excellent OSC.

Also, it is not known exactly why a transition metal-supported catalyst for purification of exhaust gas comprising the above-described porous composite metal oxide as the support displays excellent OSC even after exposure to high temperature. However, the present inventors presume the reason to be as will be described below. Specifically, in the transition metal-supported catalyst of the present invention, it is presumed that the transition metal is supported on alumina, ceria and zirconia, respectively, which are disposed at high degrees of mutual and fine dispersion. In such a transition metal-supported catalyst, the transition metal presumably displays excellent catalytic activity because the activation of transition metal active species is accelerated by its interaction with ceria and zirconia. Further, in the transition metal-supported catalyst of the present invention, since the high degree of mutual and fine dispersion among alumina, ceria, and zirconia is maintained even when exposed to high temperature, the transition metal that is supported respectively on alumina, ceria, and zirconia hardly causes grain growth and presumably the state where it is finely and uniformly dispersed is maintained.

For this reason, it is presumed that the transition metal-supported catalyst of the present invention unlikely causes its catalytic activity to be lowered even when exposed to high temperature and displays excellent catalytic activity.

On the other hand, in the case where the degree of mutual and fine dispersion among alumina, ceria, and zirconia is low, alumina does not effectively function as the diffusion barrier against ceria or zirconia under a high temperature; therefore, ceria and zirconia presumably cause grain growth. Consequently, in the transition metal-supported catalyst that has been exposed to high temperature, the transition metal will be in a state where it is nonuniformally supported on alumina, ceria, and zirconia (specifically, a state where simultaneously with the grain growth of ceria and zirconia, the transition metal supported on these has caused grain growth); therefore, the interaction of the transition metal with ceria and zirconia is not sufficiently obtained and thus, the catalytic activity presumably lowers.

Also, similarly in the case where the content ratio of alumina is low, the diffusion barrier function of alumina does not sufficiently act, and ceria and zirconia presumably cause grain growth under a high temperature. Consequently, in the transition metal-supported catalyst that has been exposed to high temperature, the transition metal supported on alumina, ceria, and zirconia will be in a state of nonuniformality (specifically, a state where simultaneously with the grain growth of ceria and zirconia, the transition metal supported on these has caused grain growth); therefore, the catalytic activity presumably lowers.

Advantageous Effects of Invention

According to the present invention, it is possible to provide a catalyst support for purification of exhaust gas capable of producing a catalyst that displays excellent oxygen storage capacity (OSC) and a catalyst that displays excellent catalytic activity (particularly, a transition metal-supported catalyst that displays high catalytic activity even at a relatively low temperature) even when exposed to high temperature, as well as to provide a production method thereof.

DESCRIPTION OF EMBODIMENTS

Figure 1:
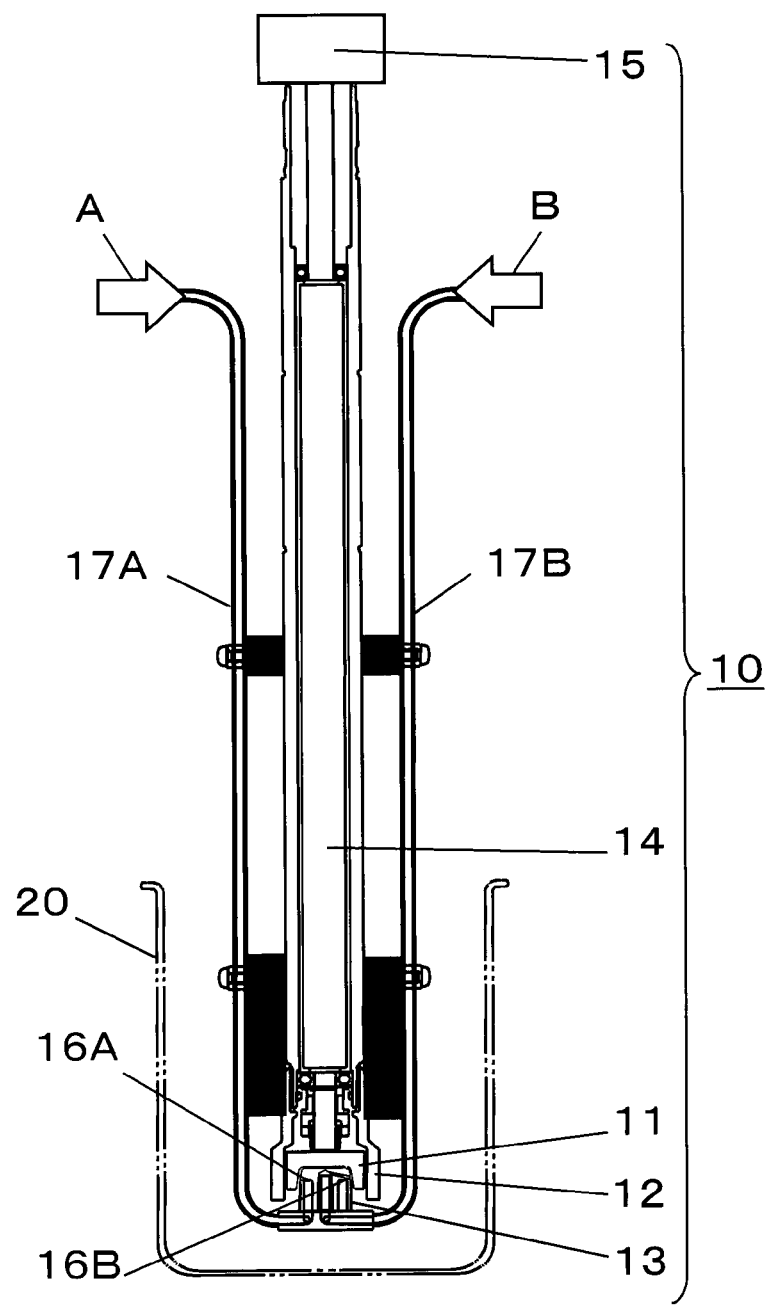
FIG. 1 is a schematic longitudinal section showing a preferred embodiment of a production apparatus for a colloidal solution to be used in the present invention.

Hereinafter, the present invention will be described in detail on the basis of preferred embodiments thereof.

First, a catalyst support for purification of exhaust gas of the present invention will be described. The catalyst support for purification of exhaust gas of the present invention comprises a porous composite metal oxide containing alumina, ceria, and zirconia and having an alumina content ratio of from 5 to 80% by mass (preferably, from 5 to 70% by mass). If the alumina content ratio is less than the lower limit, the function of alumina as a diffusion barrier becomes small and therefore, the catalyst support for purification of exhaust gas exposed to high temperature experiences decreased pore volume and specific surface area and its OSC and catalytic activity lower. On the other hand, if the alumina content ratio exceeds the upper limit, the content ratios of ceria and zirconia relatively decrease, and therefore, the OSC and activity of the catalyst lower.

Also, in the case where a noble metal is supported on a catalyst support for purification of exhaust gas of the present invention, the porous composite metal oxide preferably contains from 5 to 30% by mass of alumina, from 25 to 39% by mass of ceria, and from 33 to 51% by mass of zirconia. If the content ratio of alumina exceeds the upper limit, the content ratio of ceria decreases and thus, the OSC of the catalyst tends to lower, while the content ratio of zirconia also decrease and thus, the heat resistance of the catalyst lowers, there being a tendency that the OSC of the catalyst exposed to high temperature will further lower. In addition, if the content ratio of ceria is less than the lower limit, the OSC of the catalyst tends to lower. On the other hand, if the content ratio of ceria exceeds the upper limit, the content ratio of zirconia decreases and thus, the heat resistance of the catalyst lowers, there being a tendency that the OSC of the catalyst exposed to high temperature will lower. Also, since the content ratio of alumina too decreases, the function of alumina as the diffusion barrier becomes small, and the catalyst for purification of exhaust gas exposed to high temperature experiences decreased pore volume and specific surface area and its OSC and catalytic activity further tend to lower. Further, if the content ratio of zirconia is less than the lower limit, the heat resistance of the catalyst lowers and the OSC of the catalyst exposed to high temperature tends to lower. On the other hand, if the content ratio of zirconia exceeds the upper limit, the OSC of the catalyst tends to lower since the content ratio of ceria decreases, while the function of alumina as the diffusion barrier becomes small since the content ration of alumina decreases, and the catalyst for purification of exhaust gas exposed to high temperature experiences decreased pore volume and specific surface area, there being a tendency that the OSC and catalytic activity will lower.

By contrast, in the case where a transition metal is supported on a catalyst support for purification of exhaust gas of the present invention, the porous composite oxide preferably contains from 30 to 80% by mass of alumina. If the content ratio of alumina is less than the lower limit, the function of alumina as the diffusion barrier becomes small and the catalyst for purification of exhaust gas exposed to high temperature experiences reduced pore volume and specific surface area so that the grain growth of the transition metal is not sufficiently suppressed, there being a tendency that the catalytic activity will lower. On the other hand, if the content ratio of alumina exceeds the upper limit, the interaction of the transition metal with ceria and zirconia lowers since the content ratios of ceria and zirconia relatively decrease, and thus, the catalytic activity tends to lower. The content ratio of alumina is more preferably from 40 to 70% by mass from the viewpoint that the activity of the catalyst for purification of exhaust gas exposed to high temperature will be higher.

Also, in the case where a transition metal is supported on a catalyst support for purification of exhaust gas of the present invention, the content ratio of ceria in the porous composite metal oxide is not particularly limited but is preferably from 10 to 60% by mass, and more preferably from 20 to 50% by mass. If the content ratio of ceria is less than the lower limit, the interaction between the transition metal and ceria lowers and the catalytic activity tends to lower. On the other hand, if the content ratio of ceria exceeds the upper limit, the stabilization effect of ceria obtained by zirconia being solid-solved in ceria decreases since the content ratio of zirconia decreases, and ceria causes grain growth under a high temperature; hence, the catalytic activity of the catalyst for purification of exhaust gas exposed to high temperature lowers. Also, since the content ratio of alumina too decreases, the function of alumina as the diffusion barrier becomes small and the catalyst for purification of exhaust gas exposed to high temperature experiences reduced pore volume and specific surface area so that the grain growth of the transition metal is not sufficiently suppressed, there being a tendency that the catalytic activity will lower.

Further, in the case where a transition metal is supported on a catalyst support for purification of exhaust gas of the present invention, the content ratio of zirconia in the porous composite metal oxide is not particularly limited but is preferably from 5 to 40% by mass, and more preferably from 5 to 30% by mass. If the content ratio of zirconia is less than the lower limit, the stabilization effect of ceria decreases and the catalytic activity of the catalyst for purification of exhaust gas exposed to high temperature lowers. On the other hand, if the content ratio of zirconia exceeds the upper limit, the interaction of the transition metal with ceria and zirconia lowers since the content ratio of ceria decreases, and the catalytic activity tends to lower. Also, since the content ratio of alumina too decreases, the function of alumina as the diffusion barrier becomes small and the catalyst for purification of exhaust gas exposed to high temperature experiences reduced pore volume and specific surface area so that the grain growth of the transition metal is not sufficiently suppressed, there being a tendency that the catalytic activity will lower.

Additionally, in such a porous composite metal oxide, ceria and zirconia preferably form a solid solution. Specifically, the porous composite metal oxide according to the present invention preferably comprises alumina particles and zirconia solid-dissolved ceria particles (CZ particles). Thereby, the heat resistance of a catalyst tends to be improved.

Moreover, from the viewpoint that the heat resistance of a catalyst is improved, it is preferred that the porous composite metal oxide further contains at least one of metal oxides selected from the group consisting of oxides of rare earth elements (such as La, Pr, Y, and Sc) other than cerium and oxides of alkaline earth metals (such as Sr, Ca, and Ba). From the viewpoint that the heat resistance of a catalyst (as well as oxygen storage capacity in the case of the noble metal-supported catalyst) is further improved, it is more preferred that the porous composite metal oxide further contains at least one of yttria ($Y_2O_3$) and lanthania ($La_2O_3$), and it is particularly preferred that it further contains yttria ($Y_2O_3$). The content ratio of such a metal oxide is appropriately set so that its effects can be obtained.

The catalyst support for purification of exhaust gas of the present invention comprises a porous composite metal oxide in which alumina, ceria, and zirconia are disposed at a high degree of mutual dispersion (i.e., in a state of being mutually, finely and uniformly dispersed) even after calcination in the air at 1100° C. for 5 hours. Specifically, the porous composite metal oxide that has been subjected to the heat treatment at a high temperature under the above-described conditions satisfies a condition such that standard deviations of content ratios (as at % unit) of aluminum, cerium and zirconium elements are each 19 or less (preferably 18.5 or less, more preferably 18 or less, and particularly preferably 15 or less) with respect to 100 minute areas (with one minute area being 300 nm in length×330 nm in width) of the porous composite metal oxide, the standard deviation being determined by energy dispersive X-ray spectroscopy using a scanning transmission electron microscope equipped with a spherical aberration corrector. Thus, by using as a support, the porous composite metal oxide in which alumina, ceria, and zirconia are disposed at a high degree of mutual dispersion even after the heat treatment at a high temperature, the catalyst for purification of exhaust gas displays excellent OSC or excellent catalytic activity even when exposed to a high temperature for a prolonged time (e.g., after a durability test at 900° C. or higher for 5 hours). Especially, the catalyst for purification of exhaust gas that is a noble metal-supported catalyst displays excellent OSC even after a durability test at 1100° C.; and the catalyst for purification of exhaust gas that is a transition metal-supported catalyst displays high catalytic activity even at a relatively low temperature of 375° C. or lower. From the viewpoint that the OSC or the catalytic activity of such a catalyst are more improved, the porous composite metal oxide that has been subjected to the heat treatment at a high temperature under the above-described conditions preferably satisfies a condition such that standard deviations of content ratios (as at % unit) of cerium and zirconium elements are each 15 or less (preferably 14 or less, and more preferably 10 or less). From the viewpoint that the catalytic activity is more improved, the support for a catalyst on which a transition metal is supported particularly preferably satisfies a condition such that standard deviation of content ratio (as at % unit) of zirconium element is 9 or less (most preferably 7 or less).

Note that such standard deviation(s) can be concretely determined by the following method. Specifically, an elemental analysis of the porous composite metal oxide powder after heat treatment at high temperature is first performed using an energy dispersive X-ray analyzer (EDX) mounted on a scanning transmission electron microscope equipped with a spherical aberration corrector (e.g., Cs-STEM manufactured by Hitachi High-technologies Corporation; product name of "HD 2700"); EDX mapping is performed in an analyzing visual field with a predetermined magnification (100 pixels in length×128 pixels in width). Here, the magnification is set so that the size of one minute region is 300 nm in length×330 nm in width when the analyzing visual field is divided into 100 minute regions (10 divisions in length×10 divisions in width). Also, in the case where the analytical spot region of EDX is smaller than one pixel of the analyzing visual field, the EDX mapping data to be obtained is averaged per pixel. Next, the EDX mapping data is averaged per one minute region to calculate the content ratio of each element and then, the standard deviation of the content ratio of each element with respect to the 100 minute regions is calculated. If the standard deviation of the content ratio of the metallic element is smaller, it will indicate that the respective metal oxides are disposed in a state where they are mutually dispersed more finely and uniformly.

In addition, in the porous composite metal oxide that has been subjected to the heat treatment at a high temperature under the above-described conditions, a total pore volume of pores (mesopores) having pore diameters within a range of from 1 nm to 0.1 μm is 0.1 $cm^3/g$ or more (more preferably 0.18 $cm^3/g$ or more, and particularly preferably 0.2 $cm^3/g$ or more), as determined by a nitrogen adsorption method; and a total pore volume of pores (macropores) having pore diameters within a range of from 0.1 μm to 10 μm is 0.1 $cm^3/g$ or more (more preferably 0.3 $cm^3/g$ or more), as determined by a mercury intrusion method. If the total pore volume (particularly, the total pore volume of macropores) is less than the lower limit, in the catalyst exposed to high temperature, the diffusibility of gas into the support lowers and thus, the OSC tends to lower; the grain growth of a transition metal is not sufficiently suppressed and thus, the catalytic activity tends to lower. In addition, the upper limit of the total pore volume is not particularly limited. However, from the viewpoint that the porous composite metal oxide having a large total pore volume is bulky and is hard to be coated on a full-sized honeycomb substrate, the total pore volume of mesopores is preferably 3 cm$^3$/g or less, and more preferably 2 cm$^3$/g or less; and the total pore volume of macropores is preferably 4 cm$^3$/g or less, and more preferably 3 cm$^3$/g or less.

Further, in the porous composite metal oxide that has been subjected to the heat treatment at a high temperature under the above-described conditions, a BET specific surface area, as determined by the nitrogen adsorption method, is preferably 2 cm$^2$/g or more, and more preferably 25 cm$^2$/g or more. If the BET specific surface area is less than the lower limit, the OCS and the catalytic activity of a catalyst exposed to high temperature tend to lower. Especially, in a transition metal-supported catalyst, the grain growth of the transition metal is unlikely to be sufficiently suppressed, and hence, its catalytic activity tends to lower. The BET specific surface area is also preferably large; and its upper limit is not particularly limited but is normally 200 m$^2$/g or less.

Note that the BET specific surface area and the total pore volume of mesopores are determined by the following method. Specifically, a porous composite metal oxide is first cooled to a liquid nitrogen temperature (−196° C.), nitrogen gas is introduced at a predetermined pressure, and an amount of nitrogen adsorbed at its equilibrium pressure is determined by the constant-volume gas adsorption method or gravimetric method. Next, the pressure of nitrogen gas to be introduced is allowed to increase gradually, and an amount of nitrogen adsorbed at each equilibrium pressure is determined. The obtained amount of nitrogen adsorbed is plotted against the equilibrium pressure to obtain a nitrogen adsorption isotherm. Next, based on the obtained nitrogen adsorption isotherm, the specific surface area of the porous composite metal oxide is determined according to the BET isotherm equation. Also, a pore size distribution curve is determined from the nitrogen adsorption isotherm according to the BJH method, and the total pore volume of mesopores is determined from this pore size distribution curve.

Also, the total pore volume of macropores is determined by the mercury intrusion method. Specifically, a porous composite metal oxide is impregnated with mercury at a high pressure, and the relationship between a pressure applied and an amount of mercury impregnated is determined. Pore diameters are calculated from the pressures applied, pore volumes are calculated from the amounts of mercury impregnated, these are plotted to obtain a pore size distribution curve, and based on this pore distribution curve, the total pore volume of macropores is determined.

Next, the catalyst for purification of exhaust gas of the present invention will be described. The catalyst for purification of exhaust gas of the present invention comprises the catalyst support for purification of exhaust gas of the present invention and a noble metal or a transition metal that is supported on the support. The catalyst for purification of exhaust gas of the present invention displays excellent OSC or catalytic activity even when exposed to high temperature, because the support comprises the porous composite metal oxide in which alumina, ceria, and zirconia are disposed at a high degree of mutual and fine dispersion even after heat treatment at high temperature and preferably of which the total pore volume (particularly, the total pore volume of mesopores) and BET specific area even after the heat treatment at high temperature are relatively large. Especially, in the catalyst for purification of exhaust gas that is a transition metal-supported catalyst, the grain growth of the transition metal hardly occurs and particularly, high catalytic activity is displayed even at a relatively low temperature of 375° C. or less.

Examples of the above-described noble metal include platinum, rhodium, palladium, osmium, iridium, gold, and the like. One kind of these noble metals may be used alone or two or more kinds may be used in combination. Among these, platinum, rhodium, and palladium are preferable and palladium is more preferable from the viewpoint that the obtained catalyst will be useful as a catalyst for purification of exhaust gas or the like. The amount of the noble metal to be supported is not particularly limited and is adjusted as appropriate depending on the application or the like of the catalyst to be obtained. Nevertheless, the amount is preferred to be approximately from 0.1 to 10 parts by mass relative to 100 parts by mass of the catalyst support for purification of exhaust gas.

Examples of the above-described transition metal include Cu, Fe, Ni, Co, Mn, Zn, W, Mo, Nb, Sn, Ta, Ag, and the like. One kind of these transition metals may be used alone or two or more kinds may be used in combination. Among these, Cu and Ni are preferable from the viewpoint that high NOx reduction performance is exerted; and Cu, Fe, Ni, Mn are preferable from the viewpoint that high oxidation performance against CO or CH compounds is present.

Further, the transition metal may be supported as a metallic element or may be supported as a metal compound. Examples of the transition metal compound include oxides thereof; salts thereof such as hydroxides, chlorides, nitrates, sulfates and salts of organic acid; carbides thereof; nitrides thereof; sulfides thereof; intermediate compounds of these, as well as composite oxides of the transition metal and the like. Specifically, there mentioned CuO, Cu$_2$O, Cu(OH)$_2$, CuCO$_3$, CuFe$_2$O$_4$, CuAl$_2$O$_4$ and the like. CuO, CuAl$_2$O$_4$, Cu$_2$O, and Cu(OH)$_2$ are preferably used as such a transition metal compound from the viewpoint that the catalyst to be obtained will be useful as a catalyst for purification of exhaust gas or the like.

The amount of the transition metal to be supported is not particularly limited and is adjusted as appropriate depending on the application or the like of the catalyst to be obtained. Nevertheless, the amount is preferred to be approximately from 0.1 to 10 parts by mass relative to 100 parts by mass of the catalyst support for purification of exhaust gas.

In the catalyst for purification of exhaust gas of the present invention, the form thereof is not particularly limited, and, for example, the catalyst in the form of particles may be used as it is. Alternatively, the catalyst may be used in the following form of: a monolithic catalyst having a honeycomb shape in which the catalyst is supported on a substrate; a pellet catalyst obtained by shaping the catalyst into a pellet shape; or the like. The substrate used herein is also not particularly limited, and a particulate filter substrate (a DPF substrate), a monolithic substrate, a pellet-shaped substrate, a plate-shaped substrate, or the like can preferably be employed. In addition, the material of such a substrate is not particularly limited, and a substrate made of a ceramic such as cordierite, silicon carbide, aluminum titanate, or mullite, or a substrate made of a metal such as stainless steel containing chromium and aluminum can preferably be employed. Moreover, in the catalyst for purification of exhaust gas of the present invention, another component (e.g., a NOx storage material) that is usable for various catalysts may be supported as appropriate as long as the effect of the catalyst is not impaired.

Next, a method for producing a catalyst support for purification of exhaust gas of the present invention will be described. The method for producing a catalyst support for purification of exhaust gas of the present invention is a production method of a catalyst support for purification of exhaust gas comprising a porous composite metal oxide containing alumina, ceria, and zirconia, the method comprising the steps of:

preparing a first raw material solution containing an aluminum ion, a cerium ion, and a zirconium ion so that an alumina content ratio of the porous composite metal oxide can be from 5 to 80% by mass (preferably, from 5 to 70% by mass);

preparing a second raw solution containing a high-molecular dispersant having a weight average molecular weight of from 3000 to 15000;

introducing independently the first raw material solution and the second raw material solution directly into a region in which a shear rate is from 1000 to 200000 $sec^{-1}$, and homogeneously mixing the raw material solutions to obtain a colloidal solution of metal compounds;

adjusting a pH of the colloidal solution to between 3 and 5;

optionally, adding an organic amine to the colloidal solution and performing gelation treatment to obtain a suspension of metal compounds; and degreasing the colloidal solution after the pH adjustment or the suspension of the metal compounds and performing heat treatment at from 700 to 1050° C. in an oxidizing atmosphere, to obtain the porous composite metal oxide. According to this method, it is possible to obtain the catalyst support for purification of exhaust gas of the present invention, comprising a porous composite metal oxide in which alumina, ceria, and zirconia are disposed at a high degree of mutual and fine dispersion even after heat treatment at high temperature.

In the method for producing a catalyst support for purification of exhaust gas of the present invention, it is preferred that at least one of the first and second raw material solutions further contain a low-molecular dispersant having a molecular weight of from 40 to 200. It is more preferred that the low-molecular dispersant be contained in the first raw material solution from the viewpoint that a catalyst support for purification of exhaust gas having superior heat resistance is obtained. It is necessary that this low-molecular dispersant does not significantly alter the pHs of the material solutions. Such a low-molecular dispersant is preferably an aminocarboxylic acid (e.g., 6-aminocaproic acid or 10-aminodecanoic acid), or an intramolecular dehydration and condensation product between a carboxyl group and an amino group thereof [e.g., lactams such as aminocaproic lactam (ϵ-caprolactam) or aminodecanoic acid lactam], and 6-aminocaproic acid and ϵ-caprolactam are more preferable.

(First Material Solution Preparation Step)

The first raw material solution containing an aluminum ion, a cerium ion, and a zirconium ion is obtained by dissolving in a solvent an aluminum compound, a cerium compound, and a zirconium compound, another metal compound if necessary, and the low-molecular dispersant further if necessary.

As such an aluminum compound, a cerium compound, a zirconium compound, and another metal compound, salts of these metals (such as acetates, nitrates, chlorides, sulfates, sulfites, or inorganic complex salts) are suitably used. Among these, acetates or nitrates are particularly preferable from the viewpoint that no corrosive solution such as HCl is produced as a by-product and that no sulfur is contained which may serve as a performance-degrading component in the case of use as a catalyst support for purification of exhaust gas.

Also, examples of the solvent to be used in the first raw material solution include water, water-soluble organic solvents (such as methanol, ethanol, propanol, isopropanol, butanol, acetone, and acetonitrile), mixed solvents of water with any of the water-soluble organic solvents, and the like.

The respective concentrations of the aluminum compound, the cerium compound, the zirconium compound, and the other metal compound in the first raw material solution are appropriately adjusted so that the content ratios of alumina, ceria, zirconia, and the other metal oxide in the obtained porous composite metal oxide can be predetermined values. For example, in the case where a catalyst support on which a noble metal is supported is produced, the first raw material solution is prepared in such a manner that the content ratio of alumina can be from 5 to 30% by mass, the content ratio of ceria can be from 25 to 39% by mass, and the content ratio of zirconia can be from 33 to 51% by mass. Also, in the case where a catalyst support on which a transition metal is supported is produced, the first raw material solution is prepared in such a manner that the content ratio of alumina can be from 30 to 80% by mass (preferably, from 40 to 70% by mass). Further, in the case where a catalyst support on which a transition metal is supported is produced, the first material solution is preferably prepared in such a manner that the content ratio of ceria can be from 10 to 60% by mass (preferably, from 20 to 50% by mass) and the content ratio of zirconia can be from 5 to 40% by mass (preferably, from 5 to 30% by mass).

In addition, the cation concentration in the first raw material solution is preferably from 0.005 to 1.0 mol/L, more preferably from 0.005 to 0.5 mol/L, and further preferably from 0.01 to 0.3 mol/L. When the cation concentration is within the range, the crystallites of the metal compounds are dispersed in liquid in a state of uniform aggregates having small diameters, and a colloidal solution that is excellent in storage stability can be obtained. On one hand, if the cation concentration is less than the lower limit, the yield of the crystallites of the metal compounds tends to be lowered. On the other hand, if the cation concentration exceeds the upper limit, the distance between the crystallites of the metal compounds and/or between aggregates thereof (hereinafter, the crystallites and the aggregates are referred to as fine particles of the metal compounds) in the colloidal solution will be shorter than the size of association of the high-molecular dispersant. Hence, steric hindrance repulsive force by the adsorption of the high-molecular dispersant does not act effectively, and thus the crystallites or the aggregates tend to further aggregate with each other.

Moreover, in the case where the first raw material solution contains a low-molecular dispersant, the concentration of the low-molecular dispersant is preferably a molar concentration of from 0.1 to 0.5 folds of the cation concentration in the first raw material solution. If the concentration of the low-molecular dispersant is less than the lower limit, the low-molecular dispersant cannot entirely cover the surfaces of colloidal particles and will act insufficiently as a protecting agent, there being a tendency that colloidal particles will aggregate with each other. On the other hand, if the concentration exceeds the upper limit, a large amount of viscous tar-like substances form upon the degreasing treatment, and the specific surface area of the obtained porous composite metal oxide tends to be reduced.

(Second Material Solution Preparation Step)

The second raw material solution containing the high-molecular dispersant is obtained by dissolving in a solvent the high-molecular dispersant, a pH adjuster if necessary, and the low-molecular dispersant further if necessary. As the high-molecular dispersant, polyalkyleneimine, polyacrylic acid, polyvinylpyrolidone and polyethylene glycol are preferable. Polyalkyleneimine, polyethylene glycol, and polyacrylic acid are more preferable from the viewpoint that they can exert high dispersion capacity in liquid. Polyalkyleneimine and polyethylene glycol are particularly preferable from the viewpoint that the colloidal solution obtained under a predetermined pH condition is especially excellent in storage stability.

The weight average molecular weight of the high-molecular dispersant is preferably from 3000 to 150000, and more preferably from 8000 to 12000. When the weight average molecular weight of the high-molecular dispersant is within the range, the crystallites of the metal compounds have small diameters and are dispersed in a state of uniform aggregates, and a colloidal solution that is excellent in storage stability can be obtained. On one hand, if the weight average molecular weight of the high-molecular dispersant is less than the lower limit, the repulsive force due to steric hindrance does not manifest sufficiently even if the high-molecular dispersant adsorbs on the fine particles of the metal compounds, and the fine particles of the metal compounds tend to aggregate. On the other hand, if the weight average molecular weight exceeds the upper limit, the high-molecular dispersant forms cross-linked structures and large aggregates tend to form. Note that the weight average molecular weight is a value that is measured using gel permeation chromatography (GPC) (Device name: System for Measuring Molecular Weight Distribution (manufactured by Shimazu Corporation), solvent: THF, column: GPC-80M, temperature: 40° C., and rate: 1 ml/min) and converted relative to the standard substance (product name of "Shodex STANDARD" manufactured by SHOWA DENKO K.K.).

The concentration of the high-molecular dispersant in the second raw material solution is preferably adjusted so that the content of the high-molecular dispersant in the obtained colloidal solution can be 5 to 35 mg/m$^2$ (more preferably 5 to 15 mg/m$^2$) relative to the unit surface area of the crystallites of the metal compounds. When the content of the high-molecular dispersant in the colloidal solution is within the range, the crystallites of the metal compounds have small diameters and are dispersed in a state of uniform aggregates, and a colloidal solution that is excellent in storage stability can be obtained. On one hand, if the content of the high-molecular dispersant in the colloidal solution is less than the lower limit, the high-molecular dispersant cannot sufficiently cover the surfaces of the fine particles of the metal compounds, and thus, the fine particles of the metal compounds tend to aggregate to form larger aggregates. On the other hand, if the content exceeds the upper limit, the crosslinking reaction of the high-molecular dispersant progresses significantly because a large amount of free high-molecular dispersant is present in the colloidal solution, and aggregates having large particle diameters tend to be formed.

In addition, examples of the pH adjuster to be used in the second raw material solution include ammonia water, bases such as organic amines (e.g., ethylenediamine and hexamethylenediamine), acids such as acetic acid and nitric acid, ammonium salts (e.g., ammonium acetate and ammonium nitrate), hydrogen peroxide water, and the like. The concentration of the pH adjuster in the second raw material solution is appropriately adjusted so that the pH of the obtained colloidal solution can be between 3 and 5.

Further, in the case where the second raw material solution contains the above-described low-molecular dispersant, the content of the low-molecular dispersant is preferably a molar quantity that is 0.1 to 0.5 folds of the cation content in the first raw material solution. If the content of the low-molecular dispersant is less than the lower limit, the low-molecular dispersant cannot entirely cover the surfaces of colloidal particles and act insufficiently as a protecting agent, and thus, the colloidal particles tend to aggregate with each other. On the other hand, if the content exceeds the upper limit, large amount of viscous tar-like substances form upon the degreasing treatment and the specific surface area of the obtained porous composite metal oxide tends to be reduced.

Examples of the solvent to be used in the second raw material solution include water, water-soluble organic solvents (such as methanol, ethanol, propanol, isopropanol, butanol, acetone, and acetonitrile), mixed solvents of water with any of the water-soluble organic solvents, and the like.

(Colloidal Solution Preparation Step)

In the step of obtaining a colloidal solution, the first raw material solution and the second raw material solution are introduced independently of each other directly to a region in which a shear rate is from 1000 to 200000 sec$^{-1}$, and homogeneously mixed with each other. By performing such a homogeneous mixing, even in a solvent such as water in which crystallites of metal compounds are prone to aggregate, the crystallites of the metal compounds can be dispersed in the liquid in a state of uniform aggregates having smaller diameters.

An example of an apparatus used for such a mixing method is shown in FIG. 1. Hereinafter, the apparatus that is suitable for the present invention will be described in detail with reference to drawings. Note that, in the following description and drawings, the same or corresponding components are denoted by the same reference numerals, and overlapping descriptions will be omitted.

Figure 2:
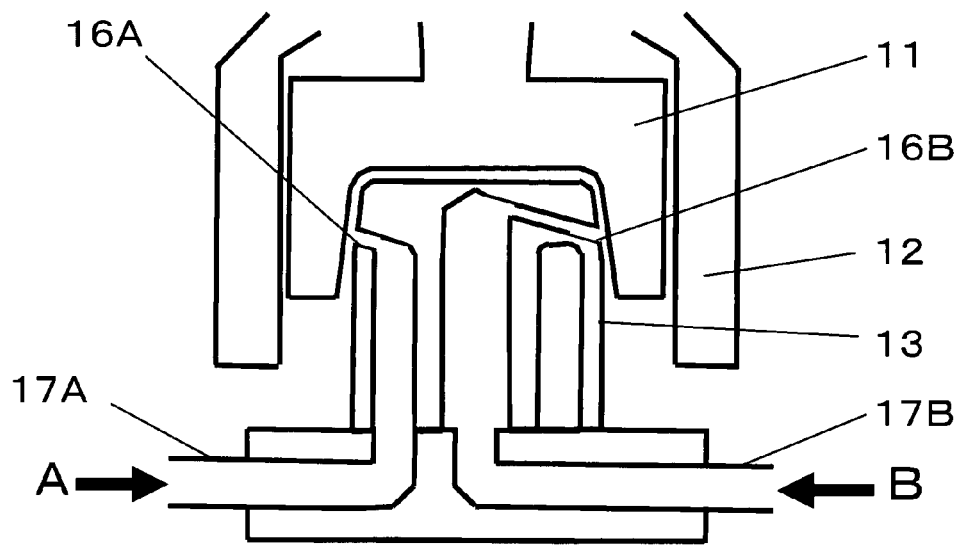
FIG. 2 is an enlarged longitudinal section showing an end portion (a stirring portion) of a homogenizer 10 shown in FIG. 1.

The production apparatus shown in FIG. 1 is provided with a homogenizer 10 as a stirrer. An end portion (a stirring portion) of the homogenizer 10 is located in a reaction vessel 20. As shown in FIG. 2, the end portion of the homogenizer 10 is provided with a concave rotor 11, a concave outer stator 12, and a convex inner stator 13. The outer stator 12 is disposed in such a way that a region with a predetermined gap is formed between the stator 12 and an outer periphery of the rotor 11. The inner stator 13 is disposed in such a way that a region with a predetermined gap is formed between the inner stator 13 and an inner periphery of the rotor 11. In addition, the rotor 11 is connected to a motor 15 via a rotary shaft 14, thereby forming a structure capable of rotation.

In addition, in the production apparatus shown in FIG. 1, multiple nozzles, i.e., nozzles 16A for introducing a raw material solution A and nozzles 16B for introducing a raw material solution B are provided on surfaces of the inner stator 13, facing the rotor 11, respectively. In addition, to the nozzles 16A, a feeder (not illustrated) for the raw material solution A is connected via a flow path 17A. To the nozzles 16B, a feeder (not illustrated) for the raw material solution B is connected via a flow path 17B. Thus, a structure is formed with which the raw material solution A and the raw material solution B can be introduced independently of each other directly to the region between the rotor 11 and the inner stator 13.

Figure 3:
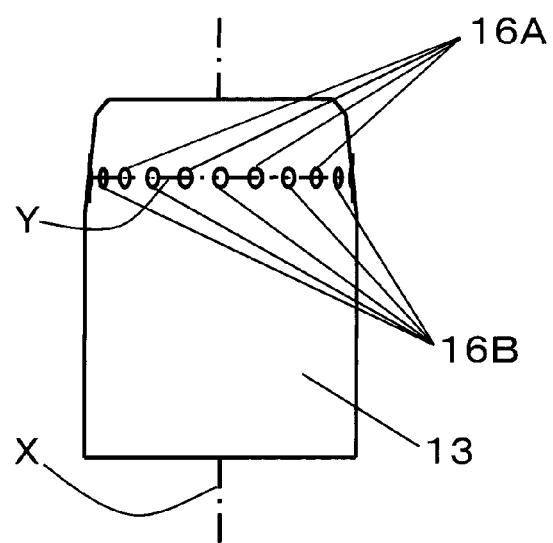
FIG. 3 is a side view of an inner stator 13 shown in FIG. 1.
Figure 4:
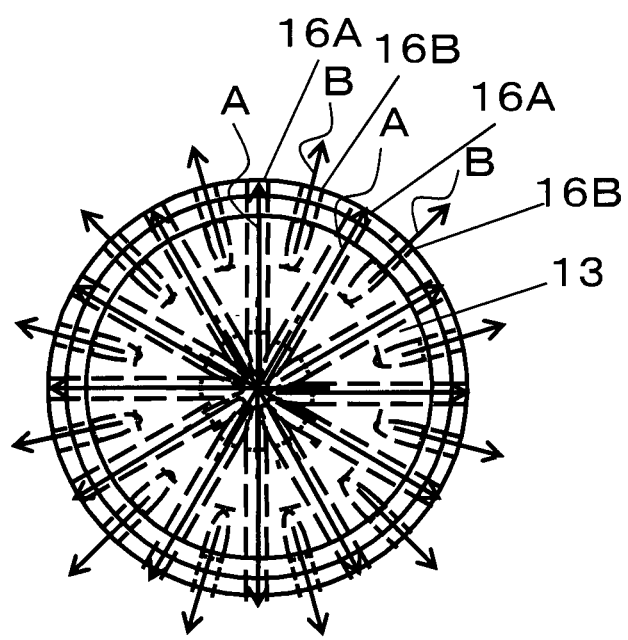
FIG. 4 is a transverse section of the inner stator 13 shown in FIG. 1.

In addition, in the production apparatus shown in FIG. 1, nozzles 16A and nozzles 16B are alternately arranged on the surface of the inner stator 13, facing the rotor 11 in an outer circumferential direction on a predetermined surface Y that is perpendicular to an axis X of rotation of the rotor 11, as shown in FIGS. 3 and 4.

Note that, in FIGS. 3 and 4, each 12 pieces of the nozzles 16A and the nozzle 16B are provided (24-holetype). However, the numbers of the nozzles 16A and the nozzles 16B are not particularly limited. Accordingly, it is only necessary to provide one nozzle 16A and one nozzle 16B (two-hole type); however, from the viewpoint that the time from the introduction of the raw material solution A and the raw material solution B into the region to the completion of the homogeneous mixing can be shortened, the numbers of the nozzles 16A and the nozzles 16B are each preferably 10 or more, and more preferably 20 or more. At the same time, an upper limit of each of the number of the nozzles 16A and the number of the nozzles 16B is not particularly restricted and varies depending on the size of the apparatus; however, from the viewpoint that clogging of the nozzles is more securely prevented, the numbers are preferably set so that the diameter of an opening portion of each of the nozzles 16A and the nozzles 16B, which are arranged alternately, can have a dimension of approximately 0.1 mm or more. Thus, the diameter of the opening portion of each nozzle is not particularly limited and varies depending on the size of the apparatus; however, the diameter is preferably approximately from 0.1 to 1 mm from the viewpoint that clogging of the nozzles is more securely prevented.

In addition, in FIGS. 3 and 4, the nozzles 16A and the nozzles 16B are alternately arranged in a single row in the outer circumferential direction on the single surface Y that is perpendicular to the axis of rotation of the rotor 11, but they may be alternately provided in multiple rows in the outer circumferential direction on multiple surfaces.

In the production apparatus shown in FIG. 1 as described above, the shear rate set at from 1000 to 200000 $sec^{-1}$, and more preferably at from 2000 to 100000 $sec^{-1}$, in the region into which the raw material solution A and the raw material solution B are introduced through the nozzles 16A and the nozzles 16B respectively, i.e., the region between the inner periphery of the rotor 11 and the outer periphery of the inner stator 13 in FIGS. 1 and 2. If the shear rate in this region is less than the lower limit, the aggregation of crystallites of the metal compounds and the structure in which the high-molecular dispersant adsorbs onto multiple crystallites are not destroyed, and thus, larger aggregates remain. On the other hand, if the shear rate in this region exceeds the limit, the high-molecular dispersant is destroyed and cannot impart sufficient repulsive force to the fine particles of the metal compounds; therefore, larger aggregates are formed and a stable colloidal solution cannot be obtained. Especially, in the case where polyalkyleneimine is used as the high-molecular dispersant, the shear rate is further preferably set at 200000 $sec^{-1}$ or less, and particularly preferably at 150000 $sec^{-1}$ or less, in the region into which the raw material solution A and the raw material solution B are respectively introduced.

Since the rotation speed of the rotor and the sizes of the gaps between the rotor and the stators are influential, the requirement for achieving those shear rates is such that they need to be set in order for the shear rate of the region to satisfy the above-described conditions. The specific rotation speed of the rotor 11 is not particularly limited and varies depending on the size of the apparatus. However, for example, when the outer diameter of the inner stator 13 is 12.0 mm, the gap between the rotor 11 and the outer stator 12 is 0.2 mm, the gap between the rotor 11 and the inner stator 13 is 0.5 mm, and the inner diameter of the outer stator 12 is 18.8 mm, the shear rate can be achieved by setting the rotation speed of the rotor 11 at preferably from 2000 to 200000 rpm, and more preferably from 3000 to 15000 rpm. In addition, when the gap between the inner stator 13 and the rotor 11 is set at 0.2 mm, the maximum rotation speed of the rotor 11 can be reduced to preferably 8387 rpm, and more preferably as little as 6291 rpm.

The size of the gap between the rotor 11 and the inner stator 13 is also not particularly limited and varies depending on the size of the apparatus. However, it is preferably from 0.2 to 1.0 mm, and more preferably from 0.5 to 1.0 mm. Moreover, the size of the gap between the rotor 11 and the outer stator 12 is not particularly limited and varies depending on the size of the apparatus. However, it is preferably from 0.2 to 1.0 mm, and more preferably from 0.5 to 1.0 mm. The shear rate in the above-described range can be achieved by adjusting the rotation speed of the rotor 11 correspondingly to the change in the sizes of the gaps. If these gaps are smaller than the lower limits, clogging of the nozzles is likely to occur. If these gaps exceed the upper limits, there is a tendency that an effective shearing force cannot be applied.

In addition, in the production apparatus shown in FIG. 1, the nozzles 16A and the nozzles 16B are preferably arranged so that the raw material solution A and the raw material solution B supplied through the nozzles 16A and the nozzles 16B respectively can be homogeneously mixed with each other within 1 msec (particularly preferably within 0.5 msec) after their introduction into the region. Note that as used herein, the time from the introduction of the raw material solutions into the region to the completion of the homogeneous mixing refers to a time taken until the raw material solution A (or the raw material solution B) introduced through a nozzle 16A (or a nozzle 16B) reaches a position of an adjacent nozzle 16B (or an adjacent nozzle 16A) and is mixed with the raw material solution B (or the raw material solution A) introduced through the nozzle 16B (or the nozzle 16A).

Hereinabove, the apparatus to be suitably used in the present invention has been described. In the present invention, the first raw material solution may be used as the raw material solution A and the second raw material solution may be used as the raw material solution B; or the order may also be opposite. Further, the present invention is not limited to the method using the production apparatus shown in FIG. 1. For example, in the production apparatus shown in FIG. 1, each of the nozzles 16A and the nozzles 16B is provided on the surface of the inner stator 13 facing the rotor 11, but each of the nozzles 16A and the nozzles 16B may be provided on the surface of the outer stator 12 facing the rotor 11. With such a configuration, the raw material solution A and the raw material solution B can be introduced independently of each other directly to the region between the rotor 11 and the outer stator 12. Note that the shear rate in the region needs to be set so that the above-described conditions can be satisfied.

The flow rate of each of the first raw material solution, and the second raw material solution is not particularly limited but is preferably from 1.0 to 30 ml/min. If the flow rate of the raw material solution is less than the lower limit, the efficiency of the production of the aggregates of crystallites of the metal compounds tends to be lowered. On the other hand, if the flow rate exceeds the upper limit, the particle diameters of the aggregates of crystallites of the metal compounds tend to be large.

(pH Adjusting Step)

In the production method of the present invention, a colloidal solution obtained in the above-described colloidal solution preparation step is adjusted to pH 3-5. When the pH of the colloidal solution is within the range, the high-molecular dispersant adsorbs onto the crystallites of the metal compounds, and the crystallites of the metal compounds have small diameters and are dispersed in a state of uniform aggregates; and a colloidal solution that is excellent in storage stability can be obtained. Especially, in the case where polyalkyleneimine is used as the high-molecular dispersant, polyalkyleneimine dissociates to form $NH_3^+$ groups and thus is prone to adsorb onto negatively charged sites or neutral sites of the crystallites of the metal compounds, whereby a dispersion effect is easily provided. On one hand, if the pH is 1 or more and less than 3, the particles of alumina (or aluminum hydroxide) do not tend to develop sufficient nucleation because the pH has not reached the neutral point of aluminum. In the porous composite metal oxide obtained by subjecting such a colloidal solution to the heat treatment as will be described later, there is a tendency that the heat resistance of alumina will be insufficient and at the same time, the degree of mutual and fine dispersion among alumina, ceria, and zirconia will be low. In addition, if the pH is less than 1, particles of ceria (or cerium hydroxide) also do not tend to develop sufficient nucleation. In the porous composite metal oxide obtained by subjecting such a colloidal solution to the heat treatment as will be described later, there is a tendency that ceria and zirconia will not sufficiently form a solid solution. On the other hand, if the pH exceeds the upper limit, the high-molecular dispersant hardly adsorbs onto the crystallites of the metal compounds and sufficient repulsive force between the crystallites of the metal compounds does not manifest, thereby the crystallites of the metal compounds tending to aggregate. Especially, in the case where polyalkyleneimine is used as the high-molecular dispersant, the dissociation degree of the polyalkyleneimine is small and the amount of the polyalkyleneimine adsorbed onto the fine particles of the metal compounds tends to decrease.

This pH adjustment may be carried out by adding the pH adjuster to the colloidal solution obtained in the above-described colloidal solution preparation step. However, the pH adjuster has preferably been added in advance to at least one of the first and the second raw material solutions (more preferably, to the second raw material solution) so that the pH of the colloidal solution obtained in the colloidal solution preparation step can be between 3 and 5.

Also, in the production method of the present invention, if necessary, a polymeric compound, such as polyalkyleneimine, polyacrylic acid, polyvinylpyrrolidone, or polyethylene glycol, is preferably added to the above-described colloidal solution of which pH has been adjusted to 3-5. Such a polymeric compound functions as a template in forming macropores, and removal thereof in the heat treatment step which will be described later will allow many macropores to be formed in a porous composite metal oxide.

The weight average molecular weight of the polymeric compound for template is preferably from 3000 to 15000, and more preferably from 8000 to 12000. If the weight average molecular weight of the polymeric compound for template is less than the lower limit, a sufficient amount of macropores does not tend to be formed. On the other hand, if the weight average molecular weight exceeds the upper limit, tar-like substances that are hardly degradable are formed, and aggregation progresses; and a sufficient amount of pores does not tend to be formed. Note that the weight average molecular weight is a value that is measured using gel permeation chromatography (GPC) (Device name: System for Measuring Molecular Weight Distribution (manufactured by Shimazu Corporation), solvent: THF, column: GPC-80M, temperature: 40° C., and rate: 1 ml/min) and converted relative to the standard substance (product name of "Shodex STANDARD" manufactured by SHOWA DENKO K.K.).

Also, the amount of the added polymeric compound for template is preferably from 50 to 250 g, and more preferably from 100 to 200 g relative to 1 L of the above-described colloidal solution. If the amount of the added polymeric compound for template is less than the lower limit, a sufficient amount of macropores does not tend to be formed. On the other hand, if the amount exceeds the upper limit, the polymeric compound for template is not be sufficiently degraded, tar-like substances are formed, aggregation progresses, and a sufficient amount of pores does not tend to be formed.

(Hydrothermal Treatment Step)

In the production method of the present invention, the above-described colloidal solution of which pH has been adjusted to 3-5 may be subjected to hydrothermal treatment, if necessary. This allows the aluminum compound to crystallize sufficiently. It is necessary that the hydrothermal treatment temperature in this hydrothermal treatment step be in the range of from 70 to 90° C. If the temperature is less than the lower limit, the crystallization of the aluminum compound is insufficient, and the rearrangement of atoms is unlikely to occur in the case where a ceria/zirconia solid solution is allowed to be formed. On the other hand, if the temperature exceeds the upper limit, the specific surface area of a catalyst support becomes small and further only ceria precipitates separately alone; therefore, the heat resistance of the catalyst is apt to lower. Particularly, such hydrothermal treatment temperature is preferably from 80 to 90° C., from the viewpoint that the aluminum compound is precipitated and the specific surface area is made large and that, at the same time, the rearrangement of atoms is accelerated and the formation of pores can be suppressed in the case where the solid solution between ceria and zirconia is allowed to be formed.

Moreover, the time of hydrothermal treatment in such a hydrothermal treatment step can be appropriately adjusted depending on the hydrothermal treatment temperature, but it is preferably in the range of from 360 to 1800 minutes, and more preferably in the range of from 1200 to 1440 minutes. If the hydrothermal treatment time is less than the lower limit, the acceleration effects for the dissolution and reprecipitation of precursors of the porous composite metal oxide tend to be insufficient. On the other hand, if the time exceeds the upper limit, the effect of hydrothermal treatment reaches a state of saturation and the productivity tends to be lowered.

(Gelation Treatment Step)

In the production method of the present invention, if necessary, the above-described colloidal solution of which pH has been adjusted to 3-5 or which has been subjected to the hydrothermal treatment may be readjusted to pH 6-9.5 by addition of an organic amine to thereby be subjected to gelation treatment. In the colloidal solution, this allows the high-molecular dispersant to be dissociated from the aggregates of the crystallites of the metal compounds, and the aggregates of the crystallites of the metal compounds instantly aggregate. However, since the organic amine achieves a similar role to that of the high-molecular dispersant, excessive aggregation is suppressed, and a suspension containing suitable sizes of aggregates of the crystallites of the metal compounds can be obtained. Temperature and time then are not particularly limited; for example, stirring is preferably carried out at a temperature from 10 to 40° C. for approximately from 5 to 60 seconds to fix the state of uniform dispersion. Also, as the organic amine, ethylenediamine and triethanolamine are preferable.

(Heat Treatment Step)

In the method for production of a catalyst support for purification of exhaust gas of the present invention, the above-described colloidal solution of which pH has been adjusted to 3-5 or the suspension of the metal compounds which has been obtained by the above-described gelation treatment step is subjected to degreasing treatment and heat treatment to obtain the catalyst support for purification of exhaust gas of the present invention.

Degreasing conditions in this step are not particularly limited. However, it is preferred that drying be performed in an oxidizing atmosphere (e.g., air) under conditions of from 80 to 100° C. and from 1 to 10 hours and then degreasing be performed under conditions of from 200 to 400° C. and from 1 to 5 hours. By performing such degreasing treatment, the high-molecular dispersant and the polymeric compound for template are removed and the above-described macropores are formed.

The heat treatment conditions require a temperature of from 700 to 1050° C. in an oxidizing atmosphere (e.g., air). If the temperature is less than the lower limit, calcination progresses during the use of a catalyst, and the OSC and the catalytic activity will significantly be lowered, because the calcination does not complete. On the other hand, if the temperature exceeds the upper limit, the specific surface area becomes small and the total pore volume becomes small; consequently, the OSC and the catalytic activity will be lowered. Such a heat treatment temperature is particularly preferred to be from 800 to 1050° C. from the viewpoint that superior OSC or catalytic activity tend to be obtained.

Moreover, such a heat treatment time is not particularly limited, but the above-described temperature is preferably maintained approximately for 1 to 10 hours. If this time is less than the lower limit, the metal compounds after the degreasing treatment do not tend to form metal oxides sufficiently. On the other hand, if it exceeds the upper limit, there is a tendency that the high temperature and oxidative atmosphere likely cause lowered performance of sintering or the like.

Next, the method for producing a catalyst for purification of exhaust gas of the present invention will be described. The method for producing a catalyst for purification of exhaust gas of the present invention comprises a step of supporting a noble metal or a transition metal on a surface of the catalyst support for purification of exhaust gas obtained by the above-described production method of the present invention. The specific method of supporting such a noble metal or a transition metal is not particularly limited. However, there is suitably used a method where the catalyst support for purification of exhaust gas is immersed in a solution obtained by dissolving a salt of the noble metal or the transition metal (a nitrate, a chloride, an acetate, or the like) or a complex of the noble metal or the transition metal in a solvent such as water or alcohol, and then the solvent is removed, followed by calcination and pulverization. Note that in the step of supporting a noble metal or a transition metal, drying conditions under which the solvent is removed are preferred to be approximately from 30 to 150° C. and within 10 minutes. In addition, calcination conditions are preferably from 250 to 600° C. and approximately from 30 to 180 minutes in an oxidizing atmosphere (e.g., air). Moreover, such step of supporting a noble metal or a transition metal may be repeated until a desired amount supported is achieved.

EXAMPLES

Hereinafter, the present invention will be described more specifically on the basis of Examples and Comparative Examples. However, the present invention is not to be limited to the following Examples.

Example 1

First, 13.75 g of ammonium cerium nitrate, 12.43 g of zirconium oxynitrate, 0.82 g of yttrium nitrate, 8.78 g of aluminum nitrate, and 1.24 g of lanthanum nitrate were dissolved in 500 g of ion-exchanged water to prepare a first raw material solution, which contained cations that would serve as raw materials of a porous composite metal oxide. These amounts added correspond to a cation concentration of 0.1 mol/L, where $Al_2O_3:CeO_2:ZrO_2:Y_2O_3:La_2O_3=10.0:36.2:47.9:2.0:3.9$ (mass ratio). Next, 62.5 g of polyethyleneimine having a weight average molecular weight of 10000 represented by in the following formula (1) and 78 g of nitric acid were dissolved in 360 g of ion-exchanged water to prepare a second raw material solution.

[Chem. 1]

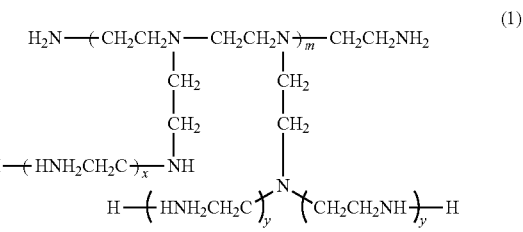

Next, by using the production apparatus (SUPER AGITATION REACTOR) shown in FIG. 1, a nanocolloidal solution of metal compounds was prepared. Note that as the stator 13, a 48-hole-type stator having 24 nozzles 16A and 24 nozzles 16B provided therein was used. Then, as shown in FIG. 1, an end of the homogenizer 10 was set to be immersed in a 100-ml beaker 20. While the rotor 11 of the homogenizer 10 was rotated at a rotation speed of 3400 rpm, the first raw material solution and the second raw material solution were each supplied to the region between the rotor 11 and the inner stator 13 through the nozzles 16A and the nozzles 16B at a supply speed of 12.5 ml/min by using tube pumps (not illustrated), and were mixed with each other to prepare a transparent nanocolloidal solution (pH 4) of the metal compounds.

Note that the outer diameter of the rotor 11 was 18.0 mm, the inner diameter of the outer stator 12 was 18.8 mm, the gap between the rotor 11 and the outer stator 12 was 0.4 mm, and the shear rate in a region between them was 8000 sec$^{-1}$. Further, the outer diameter of the inner stator 13 was 11.8 mm, the inner diameter of the rotor 11 was 12.2 mm, the gap between the rotor 11 and the inner stator 13 was 0.2 mm, and the shear rate in a region between them was 4600 sec$^{-1}$. In addition, the time taken from the introduction of the first raw material solution and the second raw material solution into the region to the completion of the homogeneous mixing was 0.37 msec. Here, the time taken to complete the homogeneous mixing is defined as a time during which the raw material solution A or the raw material solution B that is discharged from the nozzle 16A or the nozzle 16B reaches the adjacent nozzles 16B or 16B by the rotation of the rotor 11.

The obtained nanocolloidal solution was subjected to the degreasing treatment in the air at 350° C. for 5 hours, and the obtained metal compound powder was calcined in the air at 900° C. for 5 hours to obtain a porous composite metal oxide powder.

Example 2

10.58 g of ammonium cerium nitrate, 9.51 g of zirconium oxynitrate, 0.71 g of yttrium nitrate, 1.07 g of lanthanum nitrate, and 15.27 g of aluminum nitrate were dissolved in 500 g of ion-exchanged water to prepare an aqueous solution, which contained cations that would serve as raw materials of a porous composite metal oxide. These amounts added correspond to a cation concentration of 0.1 mol/L, where $Al_2O_3$:$CeO_2$:$ZrO_2$:$Y_2O_3$:$La_2O_3$=20.0:31.9:42.2:2.0:3.9 (mass ratio). Except that this aqueous solution was used as the first raw material solution, a transparent nanocolloidal solution (pH 4) of the metal compounds was prepared and then, a porous composite metal oxide powder was prepared, similarly to Example 1.

Example 3

8.22 g of ammonium cerium nitrate, 7.38 g of zirconium oxynitrate, 0.65 g of yttrium nitrate, 1.00 g of lanthanum nitrate, and 20.03 g of aluminum nitrate were dissolved in 500 g of ion-exchanged water to prepare an aqueous solution, which contained cations that would serve as raw materials of a porous composite metal oxide. These amounts added correspond to a cation concentration of 0.1 mol/L, where $Al_2O_3$:$CeO_2$:$ZrO_2$:$Y_2O_3$:$La_2O_3$=29.5:27.9:36.9:2.0:3.9 (mass ratio). Except that this aqueous solution was used as the first raw material solution, a transparent nanocolloidal solution (pH 4) of the metal compounds was prepared and then, a porous composite metal oxide powder was prepared, similarly to Example 1.

Example 4

Similarly to Example 3, a transparent nanocolloidal solution (pH 4) of the metal compounds was prepared. Ethylenediamine was quickly added to this nanocolloidal solution under propeller stirring (300 rpm) to prepare a suspension with pH being 7. After this suspension was subjected to the degreasing treatment similarly to Example 1, the obtained metal compound powder was calcined similarly to Example 1 to obtain a porous composite metal oxide powder.

Comparative Example 1

18.63 g of ammonium cerium nitrate, 16.84 g of zirconium oxynitrate, 0.50 g of yttrium nitrate, and 0.75 g of lanthanum nitrate were dissolved in 500 g of ion-exchanged water to prepare an aqueous solution, which contained cations that would serve as raw materials of a porous composite metal oxide. These added amounts correspond to a cation concentration of 0.1 mol/L, where $Al_2O_3$:$CeO_2$:$ZrO_2$:$Y_2O_3$:$La_2O_3$=0.0:40.5:53.6:2.0:3.9 (mass ratio). Except that this aqueous solution was used as the first raw material solution and a second raw material solution where the amount of nitric acid had been changed to 85 g was used, a transparent nanocolloidal solution (pH 2) of the metal compounds was prepared and then, a porous composite metal oxide powder was prepared, similarly to Example 1.

Comparative Example 2

Except that a second raw material solution where the amount of nitric acid had been changed to 115 g was used, a transparent nanocolloidal solution (pH 1) of the metal compounds was prepared similarly to Example 3. Ammonia water was quickly added to the obtained nanocolloidal solution under propeller stirring (300 rpm) to adjust pH 9.0, and then, a suspension was obtained. After this suspension was subjected to the degreasing treatment similarly to Example 1, the obtained metal compound powder was calcined similarly to Example 1 to obtain a porous composite metal oxide powder.

Comparative Example 3

Similarly to Example 3, a first raw material solution, which contained cations that would serve as raw materials of a porous composite metal oxide, was prepared. Next, 40 g of ammonia was dissolved in 460 g of ion-exchanged water to prepare a second raw material solution. The second raw material solution was quickly added to the first raw material solution, and the propeller stirring (300 rpm) was performed for 24 hours to obtain a cloud suspension (pH 10). After this suspension was subjected to the degreasing treatment similarly to Example 1, the obtained metal compound powder was calcined similarly to Example 1 to obtain a porous composite metal oxide powder.

Reference Example 1

5.01 g of ammonium cerium nitrate, 4.30 g of zirconium oxynitrate, 0.53 g of yttrium nitrate, 0.80 g of lanthanum nitrate, and 26.8 g of aluminum nitrate were dissolved in 500 g of ion-exchanged water to prepare an aqueous solution, which contained cations that would serve as raw materials of a porous composite metal oxide. These added amounts correspond to a cation concentration of 0.1 mol/L, where $Al_2O_3$:$CeO_2$:$ZrO_2$:$Y_2O_3$:$La_2O_3$=47.6:20.4:25.8:2.0:3.9 (mass ratio). Except that this aqueous solution was used as the first raw material solution, a transparent nanocolloidal solution (pH 4) of the metal compounds was prepared and then, a porous composite metal oxide powder was prepared, similarly to Example 1.

Reference Example 2

Except that a second raw material solution where the amount of nitric acid had been changed to 115 g was used, a transparent nanocolloidal solution (pH 1) of the metal compounds was prepared similarly to Example 3. The obtained nanocolloidal solution was charged in a pressure vessel made of TEFLON (registered trademark) and sealed, and it was subjected to the hydrothermal treatment by heating at 80° C. for 24 hours. Ammonia water was quickly added to the nanocolloidal solution after the hydrothermal treatment under propeller stirring (300 rpm) to adjust pH 9, and thus, a suspension was obtained. After this suspension was subjected to the degreasing treatment similarly to Example 1, the obtained metal compound powder was calcined similarly to Example 1 to obtain a porous composite metal oxide powder.

<Specific Surface Area and Pore Volume>

According to the constant volume gas absorption method at a liquid nitrogen temperature (−196° C.), an automated specific surface area/pore size distribution analyzer (manufactured by Quantachrome Corporation; product name of "Autosorb-1") was used to determine nitrogen-absorption isotherms of the porous composite metal oxide powders obtained in Examples 1-4, Comparative Examples 1-3 and Reference Examples 1, 2. Note that the porous composite metal oxide powders were subjected to vacuum deairing treatment at 120° C. for 2 hours prior to the measurement. Based on the obtained nitrogen-adsorption isotherms, the specific surface areas were determined by the BET method and the pore diameter distribution curves were determined by the BJH method for the porous composite metal oxide powders (prior to the heat treatment at high temperatures). Further, based on the obtained pore diameter distribution curves, the totals of pore volumes of pores having pore diameters in the range of from 1 nm to 0.1 μm were determined. Tables 1 and 2 show these results.

Also, a mercury porosimeter (manufactured by Quantachrome Corporation; product name of "Pore Master 60GT") was used to determine pore size distribution curves of the porous composite metal oxide powders (prior to the heat treatment at high temperatures). Based on the obtained pore size distribution curves, the totals of pore volume of pores having pore diameters in the range of from 0.1 μm to 10 μm were determined. Tables 1 and 2 show the results.

<Mean Crystallite Diameter>

An X-ray powder diffractometer (manufactured by Rigaku Corporation; product name of "RINT-2200") was used to measure X-ray diffraction (XRD) patterns of the porous composite metal oxide powders (prior to the heat treatment at high temperature) obtained in Examples 1-4, Comparative Examples 1-3 and Reference Examples 1, 2 under the conditions of: a scan step of 0.01°; a diverging and scattering slit of 1 deg; a light-receiving slit of 0.15 mm; CuKα ray, 40 kV, 20 mA; and a scanning speed of 1°/min. The mean crystallite diameters of zirconia solid-dissolved ceria particles (CZ particles) were calculated from half-widths of peaks that were attributable to (111) faces of CZ particles using the Scherrer equation:

$$D = 0.9\lambda/\beta \cos\theta$$

where D represents the crystallite diameter; λ represents the X-ray wavelength used; β represents the half-width of a measured XRD sample; and θ represents the diffraction angel. Tables 1 and 2 show the results.

<Heat Treatment of Porous Composite Metal Oxide at High Temperature>

The porous composite metal oxide powders obtained in Examples 1-4, Comparative Examples 1-3 and Reference Examples 1, 2 were subjected to the heat treatment in the air at 1100° C. for 5 hours.

<Specific Surface Area, Pore Volume and Mean Crystallite Diameter>

With respect to the porous composite metal oxide powder after the heat treatment at high temperatures, the BET specific surface areas, the totals of pore volumes as measured by the nitrogen adsorption method or the mercury intrusion method, and the mean crystallite diameters of CZ particles were calculated according to the above-described methods. Tables 1 and 2 show these results.

<Electron Microscope Observation>

Figure 5:
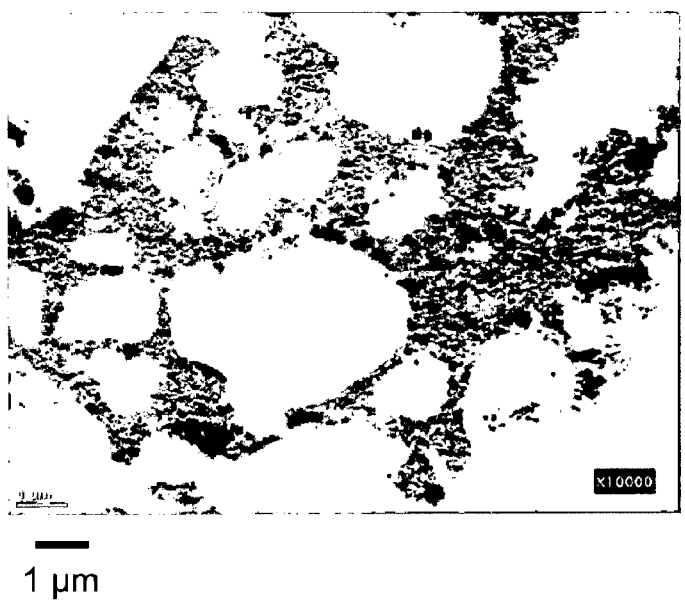
FIG. 5 is a scanning transmission electron micrograph showing the state of a porous composite metal oxide obtained in Example 3 after heat treatment at a high temperature.

A scanning transmission electron microscope equipped with a spherical aberration corrector (manufactured by Hitachi High-technologies Corporation; product name of "HD 2700") was used to observe the porous composite metal oxide powder after the heat treatment at a high temperature. FIG. 5 shows a STEM micrograph of the porous composite metal oxide powder of Example 3 (after the heat treatment at a high temperature).

<Standard Deviation of Metallic Element Content Ratios>

First, with respect to the porous composite metal oxide powders after the heat treatment at high temperatures, elemental analyses were performed using an energy dispersive X-ray analyzer (EDX; an analyzing spot size of 0.5 nm) mounted on the Cs-STEM. EDX mapping was performed in an analyzing visual field (100 pixels in length×128 pixels in width) with a magnification of 30,000. The obtained EDX mapping data was averaged per pixel. Note that the analyzing visual field was extracted so as to contain approximately 100 particles under a magnification of 30,000. Next, the analyzing visual field was divided into 100 minute regions (10 divisions, in length×10 divisions in width); the mapping data was averaged for each one minute region (one minute region being 300 nm in length×330 nm in width) and the content ratios of the respective metallic elements were determined. The standard deviation of the content ratios of each element in the 100 minute regions was calculated. Tables 1 and 2 show the results. If the standard deviations of the content ratios of the metallic elements are smaller, it will indicate that the respective metal oxides are disposed in a state where they are mutually dispersed more finely and uniformly.

<Preparation of Catalyst>

By using an aqueous solution of dinitrodiamine palladate [Pd(NH$_3$)$_2$(NO$_2$)$_2$; Pd concentration of 50 g/L], palladium was supported on the porous composite metal oxide powders obtained in Examples 1-4, Comparative Examples 1-3 and Reference Examples 1, 2 at 0.42 g per 100 g of the powder, and calcination was conducted in the air at 300° C. for 3 hours to obtain Pd-supported porous composite metal oxide powders. These powders were molded by using a cold isostatic pressing machine at 1000 kgf/cm$^2$, and then, pulverized to obtain Pd-supported catalysts in pellet forms having diameters of from 0.5 to 1 mm.

<Durability Test>

A quartz reaction tube was filled with 2 g of the obtained Pd-supported catalyst, and by using a fixed bed flow reactor (manufactured by BEST INSTRUMENTS CO., Ltd.), a rich gas [H$_2$ (2%), CO$_2$ (10%), H$_2$O (3%), and N$_2$ (the balance)] and a lean gas [CO$_2$ (10%), O$_2$ (1%), H$_2$O (3%), and N$_2$ (the balance)] were alternately supplied at intervals of 5 minutes for 5 hours under conditions of a temperature of 1000° C. and a space velocity (SV) of 10000 h$^{-1}$, whereby the durability test was performed.

<Measurement of Oxygen Storage Capacity>

A quartz reaction tube was filled with 0.5 g of the Pd-supported catalyst after the durability test, and by using the fixed bed flow reactor (manufactured by BEST INSTRUMENTS CO., Ltd.), a rich gas [CO$_2$ (2%) and N$_2$ (the balance)] and a lean gas [O$_2$ (1%) and N$_2$ (the balance)] were alternately supplied at intervals of 3 minutes under conditions of a temperature of 500° C. or 600° C. and a gas mass flow of 10 L/min. A CO$_2$ quantity generated under an atmosphere of the rich gas was measured with a motor exhaust gas analyzer (manufactured by BEST INSTRUMENTS CO., Ltd.; product name of "Bex5900Csp"). The oxygen storage/release amounts (OSC-c) and the oxygen storage/release rates (OCS-r) were calculated. Tables 1 and 2 show these results.

<Specific Surface Area and Mean Crystallite Diameter>

The BET specific surface areas of the Pd-supported catalysts after the durability test and the mean crystallite diameters of the CZ particles therein were calculated according to the above-mentioned methods. Tables 1 and 2 show these results.

TABLE 1

| | | Ex. 1 | Ex. 2 | Ex. 3 | Ex. 4 |
|---|---|---|---|---|---|
| Composite metal oxide | | | | | |
| Composition (% by mass) | Al$_2$O$_3$ | 10.0 | 20.0 | 29.5 | 29.5 |
| | CeO$_2$ | 36.2 | 31.9 | 27.9 | 27.9 |
| | ZrO$_2$ | 47.9 | 42.2 | 36.9 | 36.9 |
| | Y$_2$O$_3$ | 2.0 | 2.0 | 2.0 | 2.0 |

TABLE 1-continued

|  |  |  | Ex. 1 | Ex. 2 | Ex. 3 | Ex. 4 |
|---|---|---|---|---|---|---|
|  |  | La$_2$O$_3$ | 3.9 | 3.9 | 3.9 | 3.9 |
| pH |  |  | 4 | 4 | 4 | 4 → 7 |
| Before heat treatment at high temperature | BET specific surface area (m$^2$/g) |  | 49 | 81 | 136 | 103 |
|  | Total pore volume (cm$^3$/g) | 1 nm-0.1 μm | 0.26 | 0.25 | 0.32 | 0.34 |
|  |  | 0.1 μm-10 μm | 0.26 | 0.39 | 0.38 | 0.53 |
|  | Mean crystallite diameter of CZ particle (nm) |  | 5.4 | 5.7 | 5.6 | 6.4 |
| After heat treatment at high temperature (in the air, at 1100° C., for 5 hours) | BET specific surface area (m$^2$/g) |  | 2.2 | 4.6 | 36.6 | 34.6 |
|  | Total pore volume (cm$^3$/g) | 1 nm-0.1 μm | 0.10 | 0.13 | 0.20 | 0.44 |
|  |  | 0.1 μm-10 μm | 0.10 | 0.12 | 0.54 | 0.90 |
|  | Mean crystallite diameter of CZ particle (nm) |  | 18.9 | 15.2 | 8.0 | 17.8 |
|  | Standard deviation of content ratio of metalic element | Al | 10.2 | 12.1 | 14.8 | 18.3 |
|  |  | Ce | 9.5 | 9.3 | 8.5 | 8.6 |
|  |  | Zr | 9.7 | 9.8 | 9.6 | 9.8 |
|  |  | Y | 2.1 | 2.0 | 2.1 | 1.1 |
|  |  | La | 2.5 | 2.7 | 2.8 | 2.1 |
| Pd-supported catalyst |  |  |  |  |  |  |
| After heat treatment at high temperature (at 1100° C., for 5 hours) | OSC-c (μmol/g) | 500° C. | 332.6 | 330.5 | 323.0 | 315.0 |
|  |  | 600° C. | 383.7 | 385.3 | 355.8 | 361.7 |
|  | OSC-r (μmol/sec · g) | 500° C. | 25.32 | 29.62 | 27.02 | 18.08 |
|  |  | 600° C. | 34.30 | 37.14 | 34.88 | 30.02 |
|  | BET specific surface area (m$^2$/g) |  | 6.9 | 12.4 | 20.9 | 25.9 |
|  | Mean crystallite diameter of CZ particle (nm) |  | 29.5 | 30.8 | 29.0 | 36.0 |

TABLE 2

|  |  |  | Comp. Ex. 1 | Comp. Ex. 2 | Comp. Ex. 3 | Ref. Ex. 1 | Ref. Ex. 2 |
|---|---|---|---|---|---|---|---|
| Composite metal oxide |  |  |  |  |  |  |  |
| Composition (% by mass) | Al$_2$O$_3$ |  | 0.0 | 29.5 | 29.5 | 47.6 | 29.5 |
|  | CeO$_2$ |  | 40.5 | 27.9 | 27.9 | 20.4 | 27.9 |
|  | ZrO$_2$ |  | 53.6 | 36.9 | 36.9 | 25.8 | 36.9 |
|  | Y$_2$O$_3$ |  | 2.0 | 2.0 | 2.0 | 2.0 | 2.0 |
|  | La$_2$O$_3$ |  | 3.9 | 3.9 | 3.9 | 3.9 | 3.9 |
| pH |  |  | 2 | 1 → 9 | 10 | 4 | 1 → 9 |
| Before heat treatment at high temperature | BET specific surface area (m$^2$/g) |  | 31 | 92 | 58 | 168 | 122 |
|  | Total pore volume (cm$^3$/g) | 1 nm-0.1 μm | 0.25 | 0.18 | 0.17 | 0.45 | 0.39 |
|  |  | 0.1 μm-10 μm | 0.39 | 0.38 | 0.01 | 0.39 | 0.39 |
|  | Mean crystallite diameter of CZ particle (nm) |  | 10.2 | 6.7 | 13.0 | 4.8 | 7.1 |
| After heat treatment at high temperature (in the air, at 1100° C., for 5 hours) | BET specific surface area (m$^2$/g) |  | 0.9 | 33.9 | 9.3 | 32.4 | 35.8 |
|  | Total pore volume (cm$^3$/g) | 1 nm-0.1 μm | 0.05 | 0.18 | 0.08 | 0.32 | 0.23 |
|  |  | 0.1 μm-10 μm | 0.01 | 0.09 | 0.01 | 0.63 | 0.26 |
|  | Mean crystallite diameter of CZ particle (nm) |  | 22.3 | 16.6 | 20.0 | 7.6 | 15.7 |
|  | Standard deviation of content ratio of metalic element | Al | — | 21.7 | 26.3 | 14.6 | 19.0 |
|  |  | Ce | 9.7 | 12.2 | 16.8 | 7.8 | 11.1 |
|  |  | Zr | 9.8 | 16.3 | 17.9 | 6.4 | 12.0 |
|  |  | Y | 2.5 | 2.4 | 4.3 | 1.9 | 4.0 |
|  |  | La | 2.3 | 3.5 | 4.1 | 2.6 | 3.3 |
| Pd-supported catalyst |  |  |  |  |  |  |  |
| After heat treatment at high temperature (at 1100° C., for 5 hours) | OSC-c (μmol/g) | 500° C. | 407.0 | 224.0 | 215.0 | 223.7 | 279.0 |
|  |  | 600° C. | 473.5 | 315.0 | 310.4 | 250.6 | 323.3 |
|  | OSC-r (μmol/sec · g) | 500° C. | 17.06 | 16.80 | 16.30 | 14.70 | 17.28 |
|  |  | 600° C. | 27.80 | 21.80 | 21.10 | 22.12 | 27.04 |
|  | BET specific surface area (m$^2$/g) |  | 3.5 | 9.5 | 8.3 | 30.2 | 20.3 |
|  | Mean crystallite diameter of CZ particle (nm) |  | 30.4 | 38.5 | 45.3 | 24.2 | 33.6 |

As is apparent from the results shown in Table 1, it was confirmed that the porous composite metal oxides obtained in Examples 1-4 were such that alumina particles and CZ particles were disposed at a high degree of mutual and fine dispersion (i.e., in a state of being mutually, finely and uniformly dispersed) after the heat treatment at high temperatures (in the air, at 1100° C., for 5 hours). It was also confirmed that the porous composite metal oxides after the heat treatment at high temperatures had relatively large BET specific surface areas, and that further as shown in FIG. 5, the porous composite metal oxides had mesopores (primary pores) with pore diameters of from 1 nm to 1.0 μm which were formed between primary particles as well as had macropores (secondary pores) with pore diameters of from 0.1 μm to 10

μm which were formed between secondary particles, wherein each total pore volume of the mesopores and the macropores was relatively large. Note that it is presumed that the macropores have been formed by the removal of the high-molecular dispersant upon the degreasing treatment. It was also confirmed that by using such porous composite metal oxides as supports, there were obtained noble metal-supported catalysts (catalysts for purification of exhaust gas) which were excellent in oxygen storage capacity (OSC) even after the durability treatment (at 1100° C., for 5 hours).

By contrast, as is apparent from the results shown in Table 2, it was found that in the noble metal-supported catalyst comprising as a support a porous composite metal oxide containing no alumina (Comparative Example 1), the oxygen storage/release amount after the durability test was larger but the oxygen storage/release rate after the durability test was slower, as compared with Examples 1-4. This reason is presumed to be as will be described below. Specifically, in the porous composite metal oxide obtained in Comparative Example 1, the content ratio of CZ particles having OSC was higher than those in the porous composite metal oxides obtained in Examples 1-4; therefore, the oxygen storage/release amount of the noble metal-supported catalyst after the durability test presumably became large. On one hand, the porous composite metal oxide obtained in Comparative Example 1 did not contain alumina; therefore, no diffusion barrier function was present, the grain growth was caused by the heat treatment at a high temperature and thus, the total pore volume and BET specific surface area of the porous composite metal oxide presumably became small. Consequently, also in the noble metal-supported catalyst, its BET specific surface area became small by virtue of the durability test and thus, active sites were not sufficiently secured in the support, while its total pore volume decreased and thus, the duffusibility of gas into the support lowered. Hence, the oxygen storage/release rate presumably became slow. On the other hand, in Examples 1-4, because the diffusion barrier function of alumina acted to suppress the grain growth during the durability tests, the noble metal-supported catalysts after the durability test had relatively large BET specific surface areas and thus, active sites were sufficiently secured inside the supports, while the totals of pore volumes were relatively large and thus, the duffusibility of gas into the supports was presumably secured sufficiently. Consequently, a large amount of reactant gas easily reached the active sites inside the supports; therefore, the noble metal-supported catalysts presumably displayed excellent OSCs even after the durability tests.

Also, the noble metal-supported catalyst comprising as a support a porous composite metal oxide having low content ratios of ceria and zirconia (Reference Example 1) was inferior to Examples 1-4 in OSC. This is presumed to be because the porous composite metal oxide obtained in Reference Example 1 had a low content ratio of CZ particles possessing OSC, and active sites were not sufficiently secured in the support. On the other hand, in Examples 1-4, because predetermined amounts of ceria and zirconia were contained, active sites were sufficiently secured in the supports and thus, the noble metal-supported catalysts presumably displayed excellent OSCs even after the durability tests.

Further, in the cases where the nanocolloidal solutions were adjusted to pH 9 with ammonia water (Comparative Example 2 and Reference Example 2), the OSCs of the noble metal-supported catalysts after the durability tests were inferior to the cases where the nanocolloidal solution was adjusted to pH 7 with ethylenediamine (Example 2). This reason is presumed to be as will be described below. Specifically, in the porous composite metal oxide obtained in Comparative Example 2, by virtue of the heat treatment at a high temperature the degree of mutual and fine dispersion between alumina particles and CZ particles lowered, and the total pore volume of macropores decreased; therefore, presumably alumina did not function as the diffusion barrier against the CZ particles. This is presumed to be because by adjusting the nanocolloidal solution to pH 9 with ammonia, alumina particles aggregated and thus, the degree of mutual and fine dispersion among alumina, ceria and zirconia lowered in the obtained porous composite metal oxide. Moreover, also in the noble metal-supported catalyst, because the aggregated alumina particles did not sufficiently function as the diffusion barrier against the CZ particles, the surface areas of the CZ particles became small owing to the durability test and thus, the contact area between the CZ particles and the noble metal, i.e., OSC active sites, was not sufficiently secured, while the CZ particles caused grain growth and thus, the noble metal supported on the CZ particles also caused grain growth, and further a decrease in the total pore volume of macropores caused the diffusibility of gas into the support to be lowered, which presumably resulted in lowered OSC. In the case where the hydrothermal treatment was performed before the pH adjustment with ammonia water (Reference Example 2), the OSC of the noble metal-supported catalyst after the durability test was also inferior to that in Example 4. This is presumed to be because in the porous composite metal oxide obtained in Reference Example 2, the total pore volume of macropores increased relative to Comparative Example 2, the crystallinity of alumina was enhanced by the hydrothermal treatment and thus, the aggregation of alumina particles was improved to some extent. However, the improvement was not enough to be able to suppress the lowering of the degree of mutual and fine dispersion between the alumina particles and the CZ particles and thus, presumably a decrease in the surface area of the CZ particles was not sufficiently suppressed.

Also, in the case where a high-molecular dispersant was not used and a nanocolloidal solution with pH 10 was prepared by using ammonia water as the second raw material solution (Comparative Example 3), the OSC of the noble metal-supported catalyst after the durability test was inferior to that in Example 4. This reason is presumed to be as will be described below. Specifically, in the porous composite metal oxide obtained in Comparative Example 3, because a high-molecular dispersant was not used, the total pore volume became small even before the heat treatment at a high temperature, and further because ammonia water was used to prepare the nanocolloidal solution with pH 10, the alumina particles aggregated and similarly to Comparative Example 2, presumably alumina did not function as the diffusion barrier against the CZ particles. Consequently, also in Comparative Example 3 the OSC active sites were not sufficiently secured by virtue of the durability test similarly to Comparative Example 2, while the noble metal supported on CZ particles caused grain growth and the diffusibility of gas into the support lowered, which presumably resulted in lowered OSC of the noble metal-supported catalyst.

On the other hand, in the porous composite metal oxide obtained in Example 4 because ethylenediamine was used to adjust the nanocolloidal solution to pH 7, there was presumably obtained a porous composite metal oxide where alumina particles and CZ particles were disposed at a high degree of mutual and fine dispersion. In addition, even when this porous composite metal oxide was subjected to the heat treatment at a high temperature, the diffusion barrier of the alumina being highly dispersed functioned sufficiently to suppress the grain growth of the CZ particles and thus, the high degree of mutual and fine dispersion between alumina particles and CZ particles was presumably maintained. Consequently, also in the noble metal-supported catalyst after the durability test, the diffusion barrier of the alumina being highly and finely dispersed sufficiently functioned to suppress the grain growth of the CZ particles and thus, active sites were sufficiently secured in the support because the surface area of the CZ particles was sufficiently secured. Also, because the total pore volume of macropores was sufficiently secured and thus, the diffusibility of gas into the support was also sufficiently secured, a large amount of reactant gas easily reached the active sites inside the support too, and additionally, because the noble metal was supported on the alumina particles and the CZ particles being highly and finely dispersed, its grain growth was also suppressed, which presumably permitted excellent OSC to be obtained.

Example 5

First, ammonium cerium nitrate, zirconium oxynitrate, yttrium nitrate, aluminum nitrate, and lanthanum nitrate were dissolved in ion-exchanged water so that the cation concentration was 1.0 mol/L and the amounts of the metal salts added achieved the mass ratio corresponding to $Al_2O_3:CeO_2:ZrO_2:Y_2O_3:La_2O_3=29.5:27.9:36.9:2.0:3.9$, and further, 6-aminocaproic acid was dissolved so as to provide 0.4 mol/L. Thus, a first raw material solution, which contained cations that would serve as raw materials of a porous composite metal oxide and a low molecular dispersant, was prepared. Next, to an equal weight of ion-exchanged water there were dissolved polyethylene glycol having a weight average molecular weight of 8000 so as to provide 20 g/L and ethylenediamine so as to provide 45 g/L and thus, a second raw material solution was prepared.

Except that these first and second raw material solutions were used and the rotation speed of the rotor 11 was changed to 10000 rpm, a transparent nanocolloidal solution (pH 3.6) of the metal compounds was next prepared similarly to Example 1. Note that the shear rate in the region between the rotor 11 and the outer stator 12 was 23500 $sec^{-1}$ and that the shear rate in the region between the rotor 11 and the inner stator 13 was 13500 $sec^{-1}$.

After polyethylene glycol was added to the obtained nanocolloidal solution so as to provide 175 g/L and it was stirred sufficiently, ethylenediamine was added dropwise under stirring to prepare a suspension with pH 7. Subsequently, stirring continued for 30 minutes. After the obtained suspension was subjected to the degreasing treatment similarly to Example 1, the obtained metal compound powder was calcined similarly to Example 1 to obtain a porous composite metal oxide powder.

With respect to this porous composite metal oxide powder, specific surface areas, pore volumes, mean crystallite diameters before and after the heat treatment at a high temperature (in the air, at 1100° C., for 5 hours) were measured according to the above-described methods. Note that "Auto Pore IV9500" manufactured by Micromeritics Instrument Corporation was used as a mercury porosimeter. The standard deviations of the content ratios of the respective metallic elements of the porous composite metal oxide powder after the heat treatment at a high temperature (in the air, at 1100° C., for 5 hours) were also calculated according to the above-described method. Table 3 shows these results.

In addition, except that the obtained porous composite metal oxide powder was used, the above-described method was followed to prepare a Pd-supported catalyst in a pellet form. The oxygen storage capacity (600° C.) of this Pd-supported catalyst was measured according to the above-described method. A durability test (at 1100° C., for 5 hours) was also performed on the Pd-supported catalyst according to the above-described method, and then, the oxygen storage capacity (600° C.) after the durability test was measured according to the above-described method. Table 3 shows these results.

TABLE 3

| | | | Ex. 5 |
|---|---|---|---|
| High-molecular dispersant | | | polyethylene glycol |
| Low-molecular dispersant | | | 6-amino caproic acid |
| pH adjuster | | | ethylenediamine |
| Composite metal oxide | | | |
| Composition (% by mass) | | $Al_2O_3$ | 29.5 |
| | | $CeO_2$ | 27.9 |
| | | $ZrO_2$ | 36.9 |
| | | $Y_2O_3$ | 2.0 |
| | | $La_2O_3$ | 3.9 |
| pH | | | 3.6→7 |
| Before heat treatment at high temperature | BET specific surface area ($m^2/g$) | | 78 |
| | Total pore volume ($cm^3/g$) | 1 nm-0.1 μm | 0.54 |
| | | 0.1 μm-10 μm | 1.16 |
| | Mean crystallite diameter of CZ particle (nm) | | 6.0 |
| After heat treatment at high temperature (in the air, at 1100° C., for 5 hours) | BET specific surface area ($m^2/g$) | | 36.0 |
| | Total pore volume ($cm^3/g$) | 1 nm-0.1 μm | 0.42 |
| | | 0.1 μm-10 μm | 0.95 |
| | Mean crystallite diameter of CZ particle (nm) | | 9.0 |
| | Standard deviation of content ratio of metalic element | Al | 14.0 |
| | | Ce | 5.8 |
| | | Zr | 5.4 |
| | | Y | 3.5 |
| | | La | 2.5 |
| Pd-supported catalyst | | | |
| Before durability test | OSC-c (μmol/g) | 600° C. | 315.0 |
| | OSC-r (μmol/sec · g) | | 35.4 |
| After durability test (at 1100° C., for 5 hours) | OSC-c (μmol/g) | 600° C. | 346.6 |
| | OSC-r (μmol/sec · g) | | 32.5 |

As is apparent from the results shown in Table 3, in the case where a low-molecular dispersant was contained in the first raw material solution, which contained cations that would serve as the raw materials of the porous composite metal oxide (Example 5), it was found that a porous composite metal oxide having superior heat resistance was obtained. Further, it was found that the noble metal-supported catalyst employing this porous composite metal oxide as a support is superior in heat resistance.

Example 6

9.32 g of ammonium cerium nitrate, 1.94 g of zirconium oxynitrate, 1.1 g of yttrium nitrate, and 27.38 g of aluminum nitrate were dissolved in 500 g of ion-exchanged water to prepare a first raw material solution, which contained cations that would serve as raw materials of a porous composite metal oxide. These amounts added correspond to a cation concentration of 0.1 mol/L, where $Al_2O_3:CeO_2:ZrO_2:Y_2O_3=47.39:37.32:11.45:3.85$ (mass ratio). Except that this aqueous solution was used as the first raw material solution, a transparent nanocolloidal solution (pH 4) of the metal compounds was prepared and then, a porous composite metal oxide powder was prepared, similarly to Example 1.

Example 7

Similarly to Example 6, a nanocolloidal solution (pH 4) of the metal compounds was prepared. Ethylenediamine was quickly added to this nanocolloidal solution under propeller stirring (300 rpm) to adjust pH 7, and thus, a cloud suspension was obtained. After this suspension was subjected to the degreasing treatment similarly to Example 1, the obtained metal compound powder was calcined similarly to Example 1 to obtain a porous composite metal oxide powder.

Example 8

Similarly to Example 6, a nanocolloidal solution (pH 4) of the metal compounds was prepared. Triethanolamine was quickly added to this nanocolloidal solution under propeller stirring (300 rpm) to adjust pH 7, and thus, a cloud suspension was obtained. After this suspension was subjected to the degreasing treatment similarly to Example 1, the obtained metal compound powder was calcined similarly to Example 1 to obtain a porous composite metal oxide powder.

Comparative Example 4

Except that a second raw material solution obtained by dissolving 32.22 g of ammonium nitrate, 62.5 g of polyethyleneimine described above, and 115 g of nitric acid in 323 g of ion-exchanged water was used, a transparent nanocolloidal solution (pH 1) of the metal compounds was prepared similarly to Example 6. The obtained nanocolloidal solution was introduced in a pressure vessel made of TEFLON (registered trademark) and sealed, and it was subjected to the hydrothermal treatment by heating at 80° C. for 24 hours. Ammonia water was quickly added to the nanocolloidal solution after the hydrothermal treatment under propeller stirring (300 rpm) to adjust pH 9, and thus, a cloud suspension was obtained. After this suspension was subjected to the degreasing treatment similarly to Example 1, the obtained metal compound powder was calcined similarly to Example 1 to obtain a porous composite metal oxide powder.

Comparative Example 5

Similarly to Example 6, a transparent nanocolloidal solution, which contained cations that would serve as raw materials of a porous composite metal oxide, was prepared. Next, 40 g of ammonia was dissolved in 460 g of ion-exchanged water to prepare a second raw material solution. The second raw material solution was quickly added to the first raw material solution, and the propeller stirring (300 rpm) was performed for 24 hours to obtain a cloud suspension (pH 10). After this suspension was subjected to the degreasing treatment similarly to Example 1, the obtained metal compound powder was calcined similarly to Example 1 to obtain a porous composite metal oxide powder.

Figure 6:
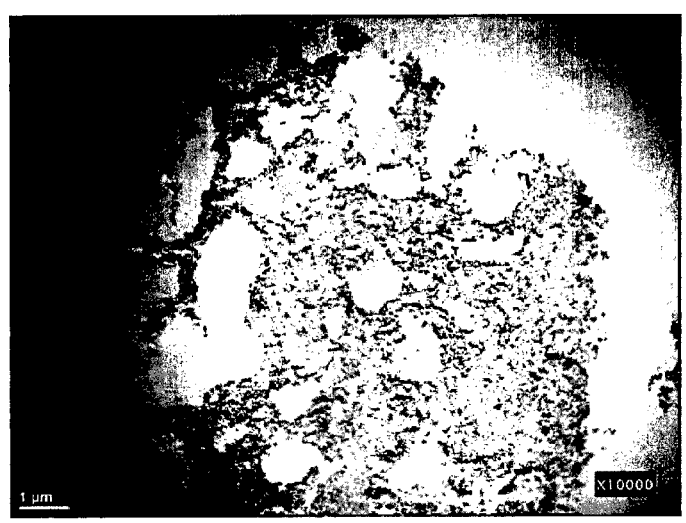
FIG. 6 is a scanning transmission electron micrograph showing the state of a porous composite metal oxide obtained in Example 7 after heat treatment at a high temperature.

With respect to each of the porous composite metal oxide powders obtained in Examples 6-8 and Comparative Examples 4 and 5, specific surface areas, pore volumes, mean crystallite diameters before and after heat treatment at a high temperature (in the air at 1100° C. for 5 hours) were measured according to the above-described methods. Note that "Pore Master 60GT" manufactured by Quantachrome Corporation was used as a mercury porosimeter. Table 4 shows these results. Also, the porous composite metal oxide powder after the heat treatment at a high temperature (in the air at 1100° C. for 5 hours) was observed by using the Cs-STEM. FIG. 6 shows a STEM micrograph of the porous composite metal oxide powder of Example 7 (after the heat treatment at a high temperature). Further, the standard deviations of the content ratios of the respective metallic elements of the porous composite metal oxide powders after the heat treatment at high temperatures (in the air at 1100° C. for 5 hours) were also calculated according to the above-described method. Table 4 shows the results.

<Preparation of Catalyst>

By using an aqueous solution of copper nitrate prepared by dissolving 0.951 g of copper nitrate ($Cu(NO_2)_2 \cdot 3H_2O$) in 100 g of ion-exchanged water, copper was supported on the porous composite metal oxide powders obtained in Examples 6-8 and Comparative Examples 4, 5 at 0.25 g per 5 g of the powder. Calcination was conducted in the air at 600° C. for 5 hours to obtain Cu-supported porous composite metal oxide powders. These powders were molded by using a cold isostatic pressing machine at 1000 kgf/cm$^2$, and then, pulverized to obtain Cu-supported catalysts in pellet forms having diameters of from 0.5 to 1 mm.

<Durability Test>

Except that 2 g of Cu-supported catalyst were used in place of the Pd-supported catalyst and the temperature was changed to 900° C., the durability tests were performed according to the above-described method.

<Evaluation of Catalytic Activity>

One gram of the Cu-supported catalyst after the durability test was placed in an atmospheric fixed bed flow reactor (BEST INSTRUMENTS CO., Ltd.), to which a model gas made of CO (0.7% by volume), $H_2$ (0.23% by volume), NO (0.12% by volume), $C_3H_6$ (0.16% by volume), $O_2$ (0.64% by volume), $CO_2$ (10% by volume), $H_2O$ (3% by volume), and $N_2$ (the balance) was supplied at a gas flow rate of 3500 mL/min. The temperature of gas entering the catalyst was adjusted to 100° C., and a CO concentration and a NO concentration in the gas entering the catalyst were measured. Thereafter, while the temperature of the gas entering the catalyst was raised to 600° C. at a rate of temperature rise of 15° C./min, a CO concentration and a NO concentration in the gas exiting from the catalyst were measured. The purification ratio of each of CO and NO was calculated from the difference between the corresponding measured values of the gas entering the catalyst and the gas exiting from the catalyst. In addition, the temperature (T50-CO or T50-NO) at which the purification ratio of CO or NO in the supplied model gas reached 50% was measured. Table 4 shows the results.

<Specific Surface Area>

The BET specific surface areas of the Cu-supported catalysts after the durability tests were calculated according to the above-described method. Tables 4 show the results.

TABLE 4

|  |  |  | Ex. 6 | Ex. 7 | Ex. 8 | Comp. Ex. 4 | Comp. Ex. 5 |
|---|---|---|---|---|---|---|---|
| Composite metal oxide | | | | | | | |
| Composition (% by mass) | | $Al_2O_3$ | 47.39 | 47.39 | 47.39 | 47.39 | 47.39 |
| | | $CeO_2$ | 37.32 | 37.32 | 37.32 | 37.32 | 37.32 |
| | | $ZrO_2$ | 11.45 | 11.45 | 11.45 | 11.45 | 11.45 |
| | | $Y_2O_3$ | 3.85 | 3.85 | 3.85 | 3.85 | 3.85 |
| pH | | | 4 | 4 → 7 | 4 → 7 | 1 → 9 | 10 |
| Before heat treatment | BET specific surface area ($m^2/g$) | | 120 | 107 | 139 | 154 | 90 |
| | Total pore volume ($cm^3/g$) | 1 nm-0.1 μm | 0.32 | 0.55 | 0.61 | 0.43 | 0.23 |
| | | 0.1 μm-10 μm | 0.40 | 0.53 | 0.55 | 0.39 | 0.10 |
| | Mean crystallite diameter of CZ particle (nm) | | 7.4 | 8.0 | 6.1 | 7.4 | 8.8 |
| After heat treatment (in the air, at 1100° C., for 5 hours) | BET specific surface area ($m^2/g$) | | 27.4 | 49.4 | 30.2 | 39.5 | 24.2 |
| | Total pore volume ($cm^3/g$) | 1 nm-0.1 μm | 0.18 | 0.38 | 0.26 | 0.33 | 0.16 |
| | | 0.1 μm-10 μm | 0.46 | 0.87 | 0.90 | 0.25 | 0.01 |
| | Mean crystallite diameter of CZ particle (nm) | | 11.5 | 16.3 | 16.8 | 14.4 | 21.4 |
| | Standard deviation of content ratio of metallic element | Al | 14.6 | 14.9 | 15.7 | 19.7 | 24.3 |
| | | Ce | 7.9 | 12.8 | 13.3 | 17.9 | 23.0 |
| | | Zr | 4.0 | 4.1 | 5.6 | 10.0 | 11.0 |
| | | Y | 2.9 | 3.1 | 3.9 | 8.9 | 9.5 |
| Cu-supported catalyst | | | | | | | |
| After durability test (at 900° C., for 5 hours) | T50-CO(° C.) | | 372 | 357 | 368 | 379 | 385 |
| | T50-NO(° C.) | | 431 | 424 | 429 | 454 | 465 |
| | BET specific surface area ($m^2/g$) | | 27 | 29 | 31 | 30 | 20 |

As is apparent from the results shown in Table 4, it was confirmed that the porous composite metal oxides obtained in Examples 6-8 were also such that alumina particles and CZ particles were disposed at a high degree of mutual and fine dispersion (i.e., in a state of being mutually, finely and uniformly dispersed) after heat treatment at high temperatures (in the air, at 1100° C., for 5 hours). Further as shown in FIG. 6, it was confirmed that the porous composite metal oxide after the heat treatment at a high temperature had mesopores (primary pores) having pore diameters of from 1 nm to 0.1 μm which were formed between primary particles, as well as had macropores (secondary pores) having pore diameters of from 0.1 μm to 10 μm which were formed between secondary particles, wherein each total pore volume of the mesopores and the macropores was relatively large. Note that the macropores have been presumably formed by the removal of the high-molecular dispersant upon the degreasing treatment.

It was also confirmed that by using such porous composite metal oxides as supports, there were obtained the transition metal-supported catalysts (catalysts for purification of exhaust gas) which displayed high catalytic activities even at a relatively low temperature of 375° C. or less even after the durability treatment (at 900° C., for 5 hours). Especially, in the cases where ethylenediamine or triethanolamine was used to adjust the nanocolloidal solutions to pH 7 (Examples 7, 8), the transition metal-supported catalysts after the durability tests displayed high catalytic activities even at a lower temperature, as compared with the case where ammonia water was used to adjust pH 9 (Comparative Example 4) as well as with the case where a high-molecular dispersant was not used and ammonia water was used to prepare a nanocolloidal solution with pH 10 as the second raw material solution (Comparative Example 5). This reason is presumed to be as will be described below. Specifically, in the porous composite metal oxides obtained in Comparative Examples 4 and 5, by virtue of the heat treatment at high temperatures the totals of pore volumes of macropores decreased and the degrees of mutual and fine dispersion between alumina particles and CZ particles decreased; therefore, presumably alumina did not function as the diffusion barrier against the CZ particles sufficiently. This is presumed to be due to the following reason: the nanocolloidal solution was adjusted to pH 9 with ammonia water in the porous composite metal oxide obtained in Comparative Example 4, while the nanocolloidal solution was adjusted to pH 10 with ammonia water in the porous composite metal oxide obtained in Comparative Example 5; thereby, alumina particles aggregated and thus, the degrees of mutual and fine dispersion among alumina, ceria and zirconia decreased in the obtained porous composite metal oxides. Moreover, also in the transition metal-supported catalysts, because the aggregated alumina particles did not sufficiently function as the diffusion barrier against the CZ particles, the CZ particles caused grain growth owing to the durability tests having been conducted, and thus the transition metals occupied a state of being nonuniformly supported on the alumina particles and the CZ particles (specifically, a state where simultaneously with the grain growth of the CZ particles, the transition metal supported on these particles caused grain growth), and the interaction between the transition metal and the CZ particles was not sufficiently obtained, which presumably resulted in lowered catalytic activities after the durability tests.

By contrast, in the porous composite metal oxides obtained in Examples 7 and 8, the totals of pore volumes of macropores were relatively large and the degrees of mutual and fine dispersion between the alumina particles and the CZ particles were also high even after the heat treatment at high temperatures. Based on this fact, it is presumed that in the porous composite metal oxides obtained in Examples 7 and 8, the alumina particles being highly and finely dispersed sufficiently functioned as the diffusion barrier against the CZ particles during the heat treatment at high temperature. This is presumed to be because in the porous composite metal oxides obtained in Examples 7 and 8, ethylenediamine or triethanolamine was used to adjust the nanocolloidal solution to pH 7. Further, also in the transition metal-supported catalysts, because the alumina particles being highly and finely dispersed sufficiently functioned as the diffusion barrier against the CZ particles, even when the durability test is conducted, the high degrees of mutual and fine dispersion between the alumina particles and the CZ particles were maintained, and the transition metals supported on these particles retained a state of being finely and uniformly dispersed, whereby excellent catalytic activities could be obtained even after the durability tests.

INDUSTRIAL APPLICABILITY

As has been described above, according to the present invention, it is possible to provide a catalyst support for purification of exhaust gas capable of producing a catalyst that displays excellent oxygen storage capacity (OSC) (particularly, a catalyst that displays excellent OSC despite a small amount of a noble metal to be supported) and a catalyst that displays excellent catalytic activity (particularly, a transition metal-supported catalyst that displays high catalytic activity even at a relatively low temperature), even when exposed to high temperatures.

REFERENCE SIGNS LIST

10: homogenizer, 11: rotor, 12: outer stator, 13: inner stator, 14: rotary shaft, 15: motor, 16A, 16B: nozzle, 17A, 17B: flow path (supply tube), 20: reaction vessel, A, B: reactant solution, X: axis of rotation, Y: surface that is perpendicular to axis of rotation X.

The invention claimed is:

1. A catalyst support for purification of exhaust gas comprising a porous composite metal oxide, the porous composite metal oxide containing alumina, ceria, and zirconia and having an alumina content ratio of from 5 to 80% by mass,
   wherein the porous composite metal oxide is produced by:
   introducing independently a first raw material solution and a second raw material solution directly into a region in which a shear rate is from 1000 to 200000 $sec^{-1}$, and homogeneously mixing the raw material solutions to obtain a colloidal solution of metal compounds, the first raw material solution containing an aluminum ion, a cerium ion, and a zirconium ion, and the second raw material solution containing a high-molecular dispersant having a weight average molecular weight of from 3000 to 15000,
   adjusting a pH of the colloidal solution to between 3 and 5,
   degreasing the colloidal solution after the pH adjustment or a suspension of metal compounds which is obtained by adding an organic amine to the colloidal solution after the pH adjustment, and then
   subjecting the solution or the suspension to heat treatment at from 700 to 1050° C. in an oxidizing atmosphere, to obtain the porous composite metal oxide, and
   wherein after calcination in air at 1100° C. for 5 hours, the porous composite metal oxide satisfies a condition such that standard deviations of content ratios (as at % unit) of aluminum, cerium and zirconium elements are each 19 or less with respect to 100 minute areas (with one minute area being 300 nm in length×330 nm in width) of the porous composite metal oxide, the standard deviation being determined by energy dispersive X-ray spectroscopy using a scanning transmission electron microscope equipped with a spherical aberration corrector.

2. The catalyst support for purification of exhaust gas according to claim 1, wherein
   the porous composite metal oxide after calcination in air at 1100° C. for 5 hours satisfies conditions such that
   a total pore volume of pores having pore diameters within a range of from 1 nm to 0.1 µm is 0.1 $cm^3$/g or more, the pore diameter being determined by a nitrogen adsorption method, and
   a total pore volume of pores having pore diameters within a range of from 0.1 µm to 10 µm is 0.1 $cm^3$/g or more, the pore diameter being determined by a mercury intrusion method.

3. The catalyst support for purification of exhaust gas according to claim 1, wherein
   the porous composite metal oxide after calcination in air at 1100° C. for 5 hours satisfies a condition such that a BET specific surface area determined by a nitrogen adsorption method is 2 $m^2$/g or more.

4. The catalyst support for purification of exhaust gas according to claim 1, wherein
   the porous composite metal oxide after calcination in air at 1100° C. for 5 hours satisfies a condition such that standard deviations of content ratios (as at % unit) of aluminum, cerium and zirconium elements are each 18.5 or less with respect to the 100 minute areas, the standard deviation being determined by the energy dispersive X-ray spectroscopy.

5. A catalyst for purification of exhaust gas comprising:
   the catalyst support for purification of exhaust gas according to claim 4; and
   a noble metal supported on the catalyst support, wherein the porous composite metal oxide contains from 5 to 30% by mass of alumina, from 25 to 39% by mass of ceria, and from 33 to 51% by mass of zirconia.

6. The catalyst for purification of exhaust gas according to claim 5, wherein
   the noble metal is palladium.

7. The catalyst support for purification of exhaust gas according to claim 1, wherein
   the porous composite metal oxide after calcination in air at 1100° C. for 5 hours satisfies a condition such that standard deviations of content ratios (as at% unit) of cerium and zirconium elements are each 15 or less with respect to the 100 minute areas, the standard deviation being determined by the energy dispersive X-ray spectroscopy.

8. A catalyst for purification of exhaust gas comprising:
   the catalyst support for purification of exhaust gas according to claim 1; and
   a transition metal supported on the catalyst support, wherein the porous composite metal oxide contains from 30 to 80% by mass of alumina.

9. The catalyst for purification of exhaust gas according to claim 8, wherein
   the transition metal is copper.

10. A method for producing a catalyst support for purification of exhaust gas comprising a porous composite metal oxide containing alumina, ceria, and zirconia, the method comprising the steps of:
    preparing a first raw material solution containing an aluminum ion, a cerium ion, and a zirconium ion so that an alumina content ratio of the porous composite metal oxide can be from 5 to 80% by mass;
    preparing a second raw solution containing a high-molecular dispersant having a weight average molecular weight of from 3000 to 15000;
    introducing independently the first raw material solution and the second raw material solution directly into a region in which a shear rate is from 1000 to 200000 $sec^{-1}$, and homogeneously mixing the raw material solutions to obtain a colloidal solution of metal compounds;

adjusting a pH of the colloidal solution to between 3 and 5; and degreasing the colloidal solution after the pH adjustment and subjecting the solution to heat treatment at from 700 to 1050° C. in an oxidizing atmosphere, to obtain the porous composite metal oxide.

11. The method for producing a catalyst support for purification of exhaust gas according to claim 10, wherein
at least one of the first and second raw material solutions further contains a low-molecular dispersant having a molecular weight of from 40 to 200.

12. The method for producing a catalyst support for purification of exhaust gas according to claim 11, wherein
the low-molecular dispersant is contained in the first raw material solution.

13. A method for producing a catalyst support for purification of exhaust gas comprising a porous metal composite metal oxide containing alumina, ceria and zirconia, the method comprising the steps of:
preparing a first raw material solution containing an aluminum ion, a cerium ion, and a zirconium ion so that an alumina content ratio of the porous composite metal oxide can be from 5 to 80% by mass;
preparing a second raw solution containing a high-molecular dispersant having a weight average molecular weight of from 3000 to 15000;
introducing independently the first raw material solution and the second raw material solution directly into a region in which a shear rate is from 1000 to 200000 $sec^{-1}$, and homogeneously mixing the raw material solutions to obtain a colloidal solution of metal compounds;
adjusting a pH of the colloidal solution to between 3 and 5;
adding an organic amine to the colloidal solution and performing gelation treatment to obtain a suspension of metal compounds; and
degreasing the suspension and subjecting the suspension to heat treatment at from 700 to 1050° C. in an oxidizing atmosphere, to obtain the porous composite metal oxide.

14. The method for producing a catalyst support for purification of exhaust gas according to claim 13, wherein
at least one of the first and second raw material solutions further contains a low-molecular dispersant having a molecular weight of from 40 to 200.

15. The method for producing a catalyst support for purification of exhaust gas according to claim 14, wherein
the low-molecular dispersant is contained in the first raw material solution.

\* \* \* \* \*